United States Patent
Enomoto

(10) Patent No.: US 7,327,952 B2
(45) Date of Patent: Feb. 5, 2008

(54) STAGE APPARATUS AND CAMERA SHAKE CORRECTION APPARATUS USING THE STAGE APPARATUS

(75) Inventor: Shigeo Enomoto, Tokyo (JP)

(73) Assignee: PENTAX Corporation, Tokyo (JP)

( * ) Notice: Subject to any disclaimer, the term of this patent is extended or adjusted under 35 U.S.C. 154(b) by 364 days.

(21) Appl. No.: 11/186,992

(22) Filed: Jul. 22, 2005

(65) Prior Publication Data

US 2006/0017818 A1    Jan. 26, 2006

(30) Foreign Application Priority Data

Jul. 26, 2004  (JP) ............................. 2004-217923

(51) Int. Cl.
*G03B 17/00* (2006.01)
(52) U.S. Cl. ..................... 396/55; 348/208.7; 33/1 M
(58) Field of Classification Search ................. 396/55; 348/219.1, 208.4, 208.7, 208.11; 359/554–557; 33/1 M
See application file for complete search history.

(56) References Cited

U.S. PATENT DOCUMENTS

| 4,615,590 | A | * | 10/1986 | Alvarez et al. | ............. | 359/556 |
|---|---|---|---|---|---|---|
| 5,172,276 | A | * | 12/1992 | Ueyama et al. | ............. | 359/813 |
| 5,266,988 | A | | 11/1993 | Washisu | ........................ | 396/55 |
| 5,678,071 | A | * | 10/1997 | Ohtake | ........................ | 396/55 |
| 5,978,598 | A | * | 11/1999 | Ishikawa | ..................... | 396/50 |
| 6,263,162 | B1 | * | 7/2001 | Yamazaki et al. | ............ | 396/55 |
| 6,606,456 | B2 | * | 8/2003 | Fujinaga | ....................... | 396/55 |
| 6,631,042 | B2 | * | 10/2003 | Noguchi | ..................... | 359/823 |
| 6,718,131 | B2 | * | 4/2004 | Okazaki et al. | ............... | 396/55 |
| 2002/0163581 | A1 | * | 11/2002 | Kitazawa et al. | ........ | 348/208.6 |
| 2003/0079472 | A1 | * | 5/2003 | Hara et al. | ..................... | 60/527 |
| 2005/0157287 | A1 | * | 7/2005 | Seo | ............. | 355/72 |
| 2005/0185057 | A1 | | 8/2005 | Seo | ......................... | 348/208.4 |
| 2005/0204640 | A1 | | 9/2005 | Seo | ................ | 52/77 |

FOREIGN PATENT DOCUMENTS

| JP | 6-46314 | 2/1994 |
|---|---|---|
| JP | 2641172 | 5/1997 |

\* cited by examiner

*Primary Examiner*—W. B. Perkey
*Assistant Examiner*—Warren K Fenwick
(74) *Attorney, Agent, or Firm*—Greenblum & Bernstein, P.L.C.

(57) ABSTRACT

A stage apparatus includes a Y-direction deformable body including a stationary support member, a movable support member and a pair of X-direction leaf springs to form a substantially rectangular shape in a free state; and an X-direction deformable body, positioned in the Y-direction deformable body, including a connecting member, a support member and a pair of Y-direction leaf springs to form a substantially rectangular shape in a free state. The support member of the X-direction deformable body includes a support member joint portion which joins the support member to the movable support member of the Y-direction deformable body. The X-direction deformable body and the Y-direction deformable body are integrally molded by synthetic resin together with the support member joint portion.

33 Claims, 18 Drawing Sheets

STAGE APPARATUS AND CAMERA SHAKE CORRECTION APPARATUS USING THE STAGE APPARATUS

BACKGROUND OF THE INVENTION

1. Field of the Invention

The present invention relates to a stage apparatus for substantially linearly moving a movable stage, that supports an image pickup device (e.g., CCD image sensor), in two orthogonal directions on a plane, and a camera shake correction apparatus using such a stage apparatus.

2. Description of the Prior Art

A known stage apparatus used as a camera shake correction apparatus in which a movable stage is substantially linearly moved in two orthogonal directions in a plane is described in, for example, Japanese laid-open patent publication H6-46314.

Such a known stage apparatus (shake correction apparatus) is provided with a square frame member having an inside space in which an X-direction driving system (first drive system) and a Y-direction driving system (second drive system) are installed. The X-direction driving system is composed of a pair of Y-direction leaf springs (parallel leaf springs) which extend from an inner surface of one side of the square frame member (casing) in a specific Y-direction, and an X-direction movable movable member (first movable member) which extends in an X-direction orthogonal to the Y-direction to connect ends of the pair of Y-direction leaf springs to each other. The Y-direction driving system is composed of a fixing member which extends in the Y-direction from the X-direction movable member, a pair of X-direction leaf springs (parallel leaf springs) which extend from the fixing member in the X-direction, and a Y-direction movable member (second movable member) which extends in the Y-direction to connect ends of the pair of X-direction leaf springs to each other. An image pickup device is fixed to the Y-direction movable member.

The stage apparatus is provided between the square frame member and the X-direction movable member with an X-direction actuator which is composed of a square planar coil and a magnetic circuit for driving the X-direction movable member in the X-direction, and is provided between the X-direction movable member and the Y-direction movable member with a Y-direction actuator which is composed of a square planar coil and a magnetic circuit for driving the Y-direction movable member in the Y-direction.

Accordingly, applying a driving force on the X-direction movable member in the X-direction via the X-direction actuator causes the pair of Y-direction leaf springs to be resiliently deformed in the X-direction, and this resilient deformation of the pair of Y-direction leaf springs causes the X-direction movable member, the Y-direction movable member and the image pickup device to move linearly in the X-direction (substantially linearly in the X-direction with a slight displacement in the Y-direction in practice because the pair of Y-direction leaf springs are resiliently bent) to correct camera shake in the X-direction. On the other hand, giving the Y-direction movable member a driving force in the Y-direction via the Y-direction actuator causes the pair of X-direction leaf springs to be resiliently deformed in the Y-direction, and this resilient deformation of the pair of X-direction leaf springs causes the Y-direction movable member and the image pickup device to move linearly in the Y-direction (substantially linearly in the Y-direction with a slight displacement in the X-direction in practice because the pair of X-direction leaf springs are resiliently bent) to correct camera shake in the Y-direction.

It is troublesome to assemble the shake correction apparatus disclosed in the aforementioned Japanese laid-open patent publication (H6-46314) because the square frame member, the pair of Y-direction leaf springs, the pair of X-direction movable member, the fixing member, the pair of X-direction leaf springs and the Y-direction movable member need to be connected to one another by adhesive or by fitting to complete the shake correction apparatus. Therefore, a high production cost of such a conventional shake correction apparatus is inevitable.

Additionally, if the pair of Y-direction leaf springs are reduced in size in the optical axis direction for the purpose of miniaturizing the shake correction apparatus in the optical axis direction, the weight of the X-direction movable member is exerted on the pair of Y-direction leaf springs if the shake correction apparatus is orientated so that the optical axis extends vertically (upward/downward direction), and the influence of this weight may bend and twist the pair of Y-direction leaf springs. This bending and twisting tend to occur in a middle portion of each Y-direction leaf spring in the lengthwise direction thereof. Once such bending and twisting occur, the square frame member and the X-direction movable member are displaced from each other in the optical axis direction. Due to this displacement, the imaging surface of the image pickup device does not lie in a plane orthogonal to the optical axis.

This problem also arises in the pair of X-direction leaf springs in the case where the pair of X-direction leaf springs are reduced in size in the optical axis direction because the weight of the Y-direction movable member is exerted on the pair of X-direction leaf springs if the shake correction apparatus is orientated so that the optical axis extends vertically.

Moreover, if the aforementioned bending and twisting exceed the deformable limit of each leaf spring, plastic deformation occurs in the pair of X-direction leaf springs or the pair of Y-direction leaf springs. Such a plastic deformation lowers the accuracy of focusing down to an unrecoverable degree. Moreover, the possibility of each leaf spring (each X-direction leaf spring and each Y-direction leaf spring) being bent and twisted is increased if each leaf spring falls into a habit of bending.

Furthermore, even if the shake correction apparatus is not orientated so that the optical axis extends vertically, there is a possibility of such problems arising if an unintentional force in the optical axis direction, which may be caused by, e.g., an impact applied to the camera when the camera is accidentally dropped to the floor, is applied to the pair of X-direction leaf springs and/or the pair of Y-direction leaf springs.

SUMMARY OF THE INVENTION

The present invention provides an easily manufacturable and low-production-cost stage apparatus in which neither bending nor twisting occurs in either the pair of X-direction leaf springs or the pair of Y-direction leaf springs even if the shake correction apparatus is orientated horizontally so that the optical axis extends vertically or even if an unintentional force in the optical axis direction is applied, and also provides a camera shake correction apparatus using such a stage apparatus. According to an aspect of the present invention, a stage apparatus is provided, including a Y-direction deformable body including a stationary support member, a movable support member and a pair of X-direction leaf springs to form a substantially rectangular shape in a free state; and an X-direction deformable body, positioned in the Y-direction deformable body, including a connecting member, a support member and a pair of Y-direction leaf springs to form a substantially rectangular shape in a free state. The stationary support member and the movable support member of the Y-direction deformable body and a pair of the Y-direction leaf springs of the X-direction deformable body extend in a specific Y-direction, the stationary support member being fixed to a stationary body. A pair of the X-direction leaf springs of the Y-direction deformable body and the connecting member and the support member of the X-direction deformable body extend in an X-direction perpendicular to the Y-direction. The support member of the X-direction deformable body includes a support member joint portion which joins the support member to the movable support member of the Y-direction deformable body, and wherein the X-direction deformable body and the Y-direction deformable body are integrally molded by synthetic resin together with the support member joint portion.

It is desirable for a thickness of each pair of X-direction leaf springs of the Y-direction deformable body in the Y-direction to be smaller than a thickness of each the stationary support member and the movable support member of the Y-direction deformable body in the X-direction.

It is desirable for a thickness of each pair of Y-direction leaf springs of the X-direction deformable body in the X-direction to be smaller than a thickness of each the support member and the connecting member of the X-direction deformable body in the Y-direction.

It is desirable for each pair of X-direction leaf springs to include two grooves at opposite ends thereof, respectively, which extend in a Z-direction orthogonal to both the X-direction and the Y-direction.

It is desirable for each pair of Y-direction leaf springs to include two grooves at opposite ends thereof, respectively, which extend in a Z-direction orthogonal to both the X-direction and the Y-direction.

It is desirable for opposite ends of each pair of X-direction leaf springs to be smaller in thickness than a middle portion thereof in the Y-direction.

It is desirable for opposite ends of each pair of Y-direction leaf springs to be smaller in thickness than a middle portion thereof in the X-direction.

It is desirable for the X-direction deformable body and the Y-direction deformable body to be molded as one body by injection molding.

It is desirable for the stage apparatus to include a shake correction apparatus, including a coil substrate fixed to the connecting member; at least one position sensor, mounted to the coil substrate, for detecting a position of the coil substrate in the X-direction and the Y-direction; and an X-direction planar drive coil and a Y-direction planar drive coil which are mounted to the coil substrate to be respectively positioned in magnetic fields of two stationary magnets fixed to the stationary body.

It is desirable for at least one projection which projects from the stationary support member to be fixed to the stationary body.

The stage apparatus can incorporated in a camera.

It is desirable for the coil substrate lies in a plane perpendicular to a Z-direction orthogonal to both the X-direction and the Y-direction.

It is desirable for an image pickup device to be mounted to the coil substrate.

In an embodiment, a stage apparatus is provided, including a Y-direction deformable body including a stationary support member, a movable support member and a pair of X-direction leaf springs to form a substantially rectangular shape in a free state; and an X-direction deformable body, positioned in the Y-direction deformable body, including a connecting member, a support member and a pair of Y-direction leaf springs to form a substantially rectangular shape in a free state. The stationary support member and the movable support member of the Y-direction deformable body and a pair of the Y-direction leaf springs of the X-direction deformable body extend in a specific Y-direction, the stationary support member being fixed to a stationary body. A pair of the X-direction leaf springs of the Y-direction deformable body and the connecting member and the support member of the X-direction deformable body extend in an X-direction perpendicular to the Y-direction. At least one pair of the pair of X-direction leaf springs and the pair of Y-direction leaf springs are made of metal. The support member of the X-direction deformable body includes a support member joint portion which joins the support member to the movable support member of the Y-direction deformable body. The X-direction deformable body and the Y-direction deformable body, except the at least one pair of the pair of X-direction leaf springs and the pair of Y-direction leaf springs which are made of metal, are integrally molded by synthetic resin together with the support member joint portion.

The stage apparatus can include an X-direction reinforcing element which is fixed to a middle portion of each the pair of X-direction leaf springs in a lengthwise direction thereof so that a flexural rigidity and a torsional rigidity of the middle portion of each the pair of X-direction leaf springs are greater than those of a remaining portion of each the pair of X-direction leaf springs.

It is desirable for the X-direction reinforcing element to be made of synthetic resin.

It is desirable for the pair of X-direction leaf springs to be made of metal. The X-direction reinforcing element includes a pair of X-direction reinforcing projections which are integrally formed on each the pair of X-direction leaf springs by press forming to project from opposite ends thereof in a Z-direction orthogonal to both the X-direction and the Y-direction.

The stage apparatus can include a Y-direction reinforcing element which is fixed to a middle portion of each the pair of Y-direction leaf springs in a lengthwise direction thereof so that a flexural rigidity and a torsional rigidity of the middle portion of each the pair of Y-direction leaf springs are greater than those of a remaining portion of each the pair of Y-direction leaf springs.

It is desirable for the Y-direction reinforcing element to be made of synthetic resin.

It is desirable for the pair of Y-direction leaf springs to be made of metal. The Y-direction reinforcing element includes a pair of Y-direction reinforcing projections which are integrally formed on each the pair of Y-direction leaf springs by press forming to project from opposite ends thereof in a Z-direction orthogonal to both the X-direction and the Y-direction.

It is desirable for each pair of X-direction reinforcing projections to be L-shaped in cross section.

It is desirable for each pair of Y-direction reinforcing projections to be L-shaped in cross section.

It is desirable for the pair of X-direction leaf springs to be made of metal and formed as two leaf spring portions of a U-shaped spring.

It is desirable for the pair of Y-direction leaf springs to be made of metal and formed as two leaf spring portions of a U-shaped spring.

It is desirable for the stage apparatus to include a coil substrate fixed to the connecting member; at least one position sensor, mounted to the coil substrate, for detecting a position of the coil substrate in the X-direction and the Y-direction; and an X-direction planar drive coil and a Y-direction planar drive coil which are mounted to the coil substrate to be respectively positioned in magnetic fields of two stationary magnets fixed to the stationary body.

In an embodiment, a camera shake correction apparatus using the stage apparatus is provided, the camera shake correction apparatus including a camera which incorporates the stage apparatus; an image pickup device positioned behind a photographing optical system of the camera, having an imaging surface located on an image plane of the photographing optical system, and being movable together with the connecting member of the X-direction deformable body; a camera shake detection sensor which detects camera shake of the camera; and a controller which applies a voltage to the X-direction planar drive coil and the Y-direction planar drive coil in accordance with the camera shake detected by the camera shake detection sensor to stabilize an object image which is formed on the imaging surface of the image pickup device through the photographing optical system.

It is desirable for the controller to apply the voltage to the X-direction planar drive coil and the Y-direction planar drive coil to reduce a difference between the amount of the camera shake detected by the camera shake detection sensor and the amount of movement of the connecting member which is detected by the position sensor.

In an embodiment, a camera shake correction apparatus using the stage apparatus is provided, the camera shake correction apparatus including a camera which incorporates the stage apparatus;

a correction lens located in front of an image plane of a photographing optical system of the camera, positioned so that an optical axis of the correction lens coincides with an optical axis of the photographing optical system, the correction lens being movable together with the connecting member of the X-direction deformable body; a camera shake detection sensor which detects camera shake of the camera; and a controller which applies a voltage to the X-direction planar drive coil and the Y-direction planar drive coil in accordance with the camera shake detected by the camera shake detection sensor to stabilize an object image which is formed on the imaging surface of the image pickup device through the photographing optical system. 33.

It is desirable for the controller to apply the voltage to the X-direction planar drive coil and the Y-direction planar drive coil to reduce a difference between the amount of the camera shake detected by the camera shake detection sensor and the amount of movement of the connecting member which is detected by the position sensor.

According to the present invention, an easily-manufacturable and low-production-cost stage apparatus is achieved in which neither bending nor twisting occurs in either the pair of X-direction leaf springs or the pair of Y-direction leaf springs even if the shake correction apparatus is orientated horizontally so that the optical axis extends vertically or even if an unintentional force in the optical axis direction is applied.

The present disclosure relates to subject matter contained in Japanese Patent Application No. 2004-217923 (filed on Jul. 26, 2004) which is expressly incorporated herein in its entirety.

BRIEF DESCRIPTION OF THE DRAWINGS

The present invention will be discussed below in detail with reference to the accompanying drawings, in which.

DESCRIPTION OF THE PREFERRED EMBODIMENTS

A first embodiment of a camera shake correction apparatus (image stabilizer) according to the present invention will be hereinafter discussed with reference to FIGS. 1 through 11. The camera shake correction apparatus 15 is incorporated in a digital camera 10 (stationary body) as shown in FIG. 1.

Figure 1:
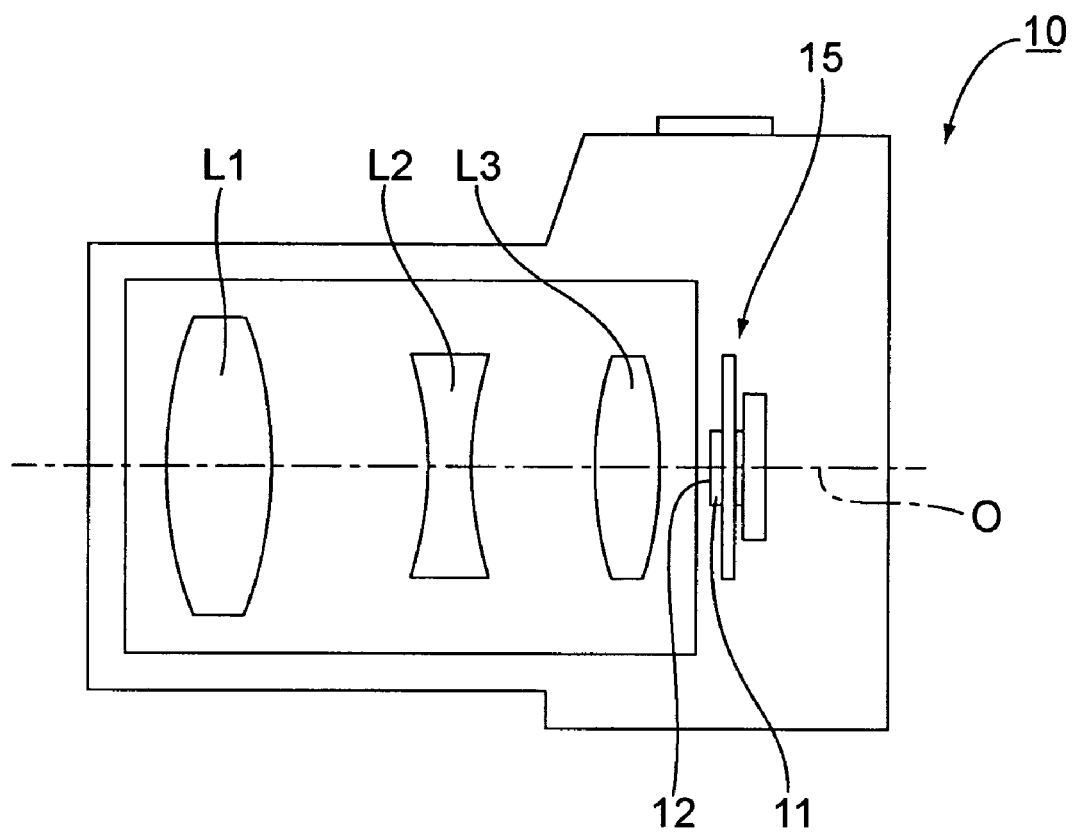
FIG. 1 is a longitudinal sectional view of a digital camera which incorporates a first embodiment of a camera shake correction apparatus according to the present invention.
Figure 2:
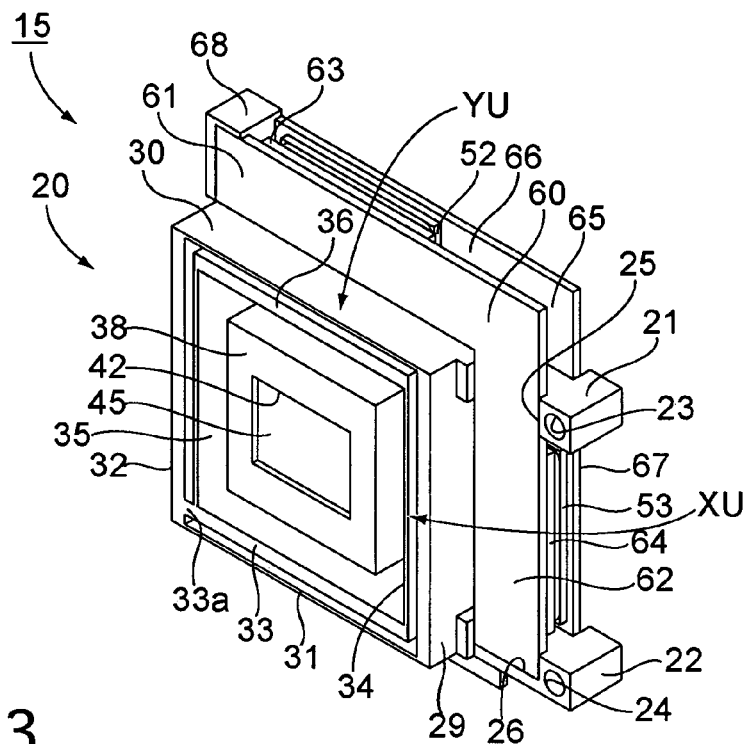
FIG. 2 is a perspective view of the camera shake correction apparatus.

As shown in FIG. 1, the digital camera 10 is provided therein with a photographing optical system including a plurality of lenses L1, L2 and L3. An image pickup device (e.g., CCD or CMOS image sensor) 11 is provided behind the lens L3. The image pickup device 11 is provided with an imaging surface (image-forming plane) 12 which is located on an image plane of the photographing optical system and is perpendicular to an optical axis O of the photographing optical system. The image pickup device 11 is secured to the camera shake correction apparatus 15 that is incorporated in the digital camera 10.

The camera shake correction apparatus 15 is constructed as described in the following description with reference to FIGS. 2 through 7.

The camera shake correction apparatus 15 is provided with a stage apparatus (movable stage) 20 which is fixed to a camera body (stationary body) to be positioned immediately behind the lenses L1, L2 and L3. The stage apparatus 20 is made of synthetic resin such as ABS resin or polycarbonate resin, and is provided with a pair of spacers (upper and lower spacers) 21 and 22 which extend rightward as viewed in FIG. 3 along an X-direction (horizontal direction of the digital camera 10; the arrow X in FIG. 3). The stage apparatus 20 is fixed to the camera body by two set screws (not shown) which extend through upper and lower fixing holes 23 and 24 drilled in ends of the pair of spacers 21 and 22, respectively. The pair of spacers 21 and 22 are provided on front surfaces thereof with a pair of front mounting recesses 25 and 26, respectively, and are further provided on rear surfaces of the pair of spacers 21 and 22 with a pair of rear mounting recesses 27 and 28, the shapes of which correspond to the pair of front mounting recesses 25 and 26, respectively. The stage apparatus 20 is provided with a stationary support side-member (stationary support member/stationary support plate) 29 which is elongated in a Y-direction (vertical direction of the digital camera 10; the arrow Y in FIG. 3; vertical direction as viewed in FIG. 3), and the pair of spacers 21 and 22 are connected to each other by the stationary support side-member 29. The stage apparatus 20 is provided with a pair of X-direction leaf springs (upper and lower resilient leaves) 30 and 31 which are elongated leftward as viewed in FIG. 3 along the X-direction from upper and lower ends of the stationary support side-member 29. The stage apparatus 20 is provided with a movable support side-member (movable support member/movable support plate) 32 which is elongated in the Y-direction, and left ends (as viewed in FIG. 3) of the pair of X-direction leaf springs 30 and 31 are connected to each other by the movable support side-member 32. The thickness of each X-direction leaf spring 30 and 31 in the Y-direction is smaller than the thickness of each of the stationary support side-member 29 and the movable support side-member 32 in the X-direction, and the stationary support side-member 29 and the movable support side-member 32 are not resiliently deformable, whereas each of the pair of X-direction leaf springs 30 and 31 is resiliently deformable in the Y-direction. The stationary support side-member 29, the pair of X-direction leaf springs 30 and 31 and the movable support side-member 32 constitute a Y-direction deformable body YU.

Figure 3:
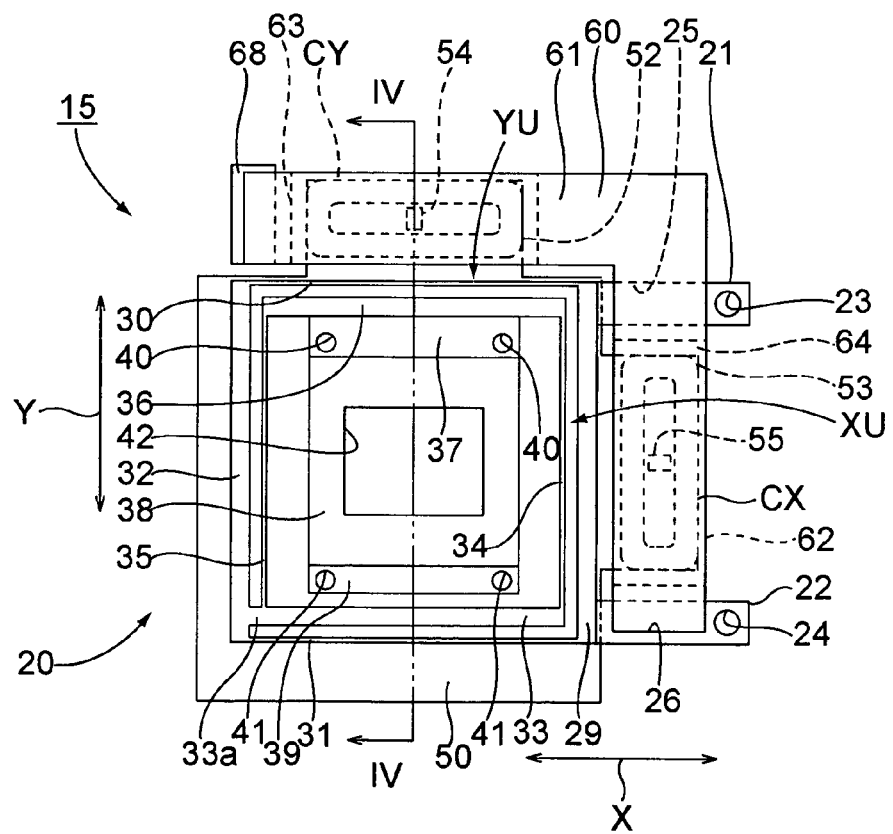
FIG. 3 is a front elevational view of the camera shake correction apparatus.
Figure 4:
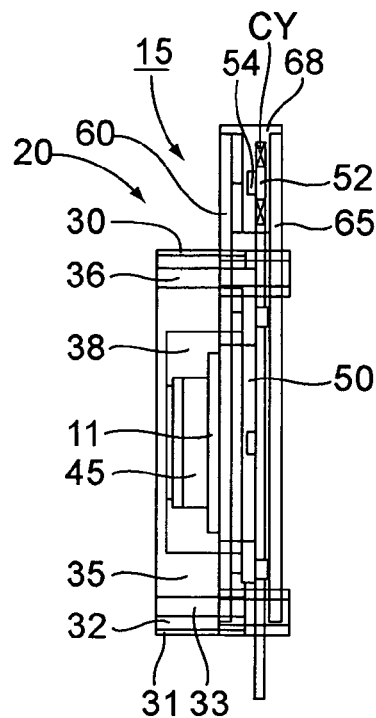
FIG. 4 is a cross sectional view taken along IV-IV line shown in FIG. 3.
Figure 5:
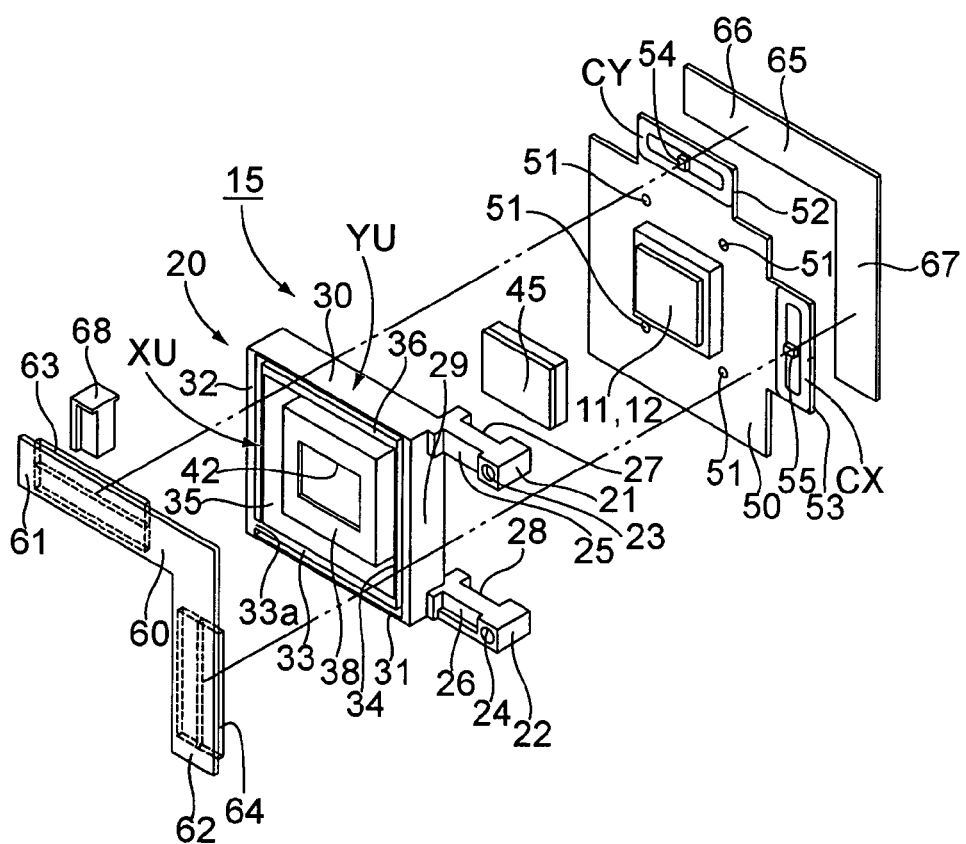
FIG. 5 is an exploded perspective view of the camera shake correction apparatus.
Figure 6:
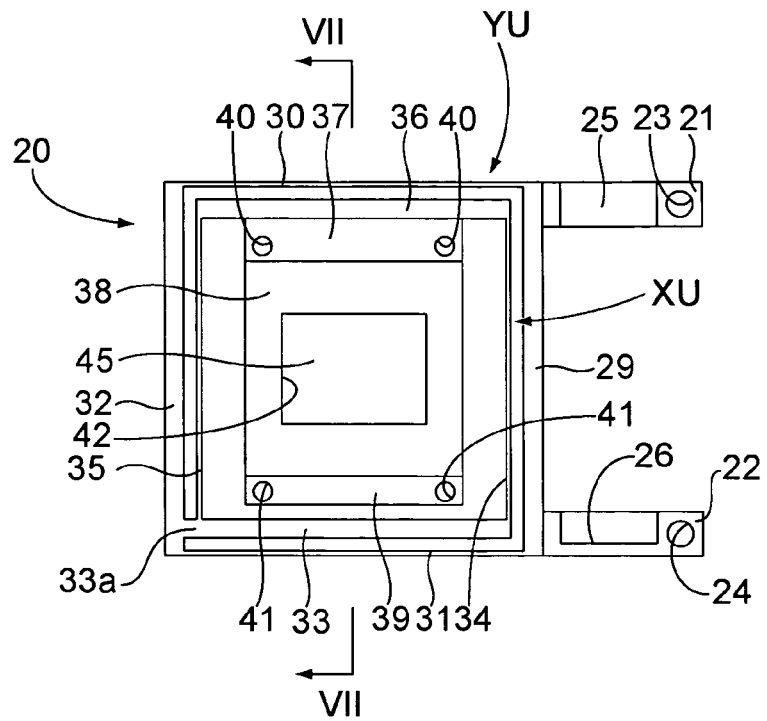
FIG. 6 is a front elevational view of a stage apparatus incorporated in the first embodiment of the camera shake correction apparatus.
Figure 7:
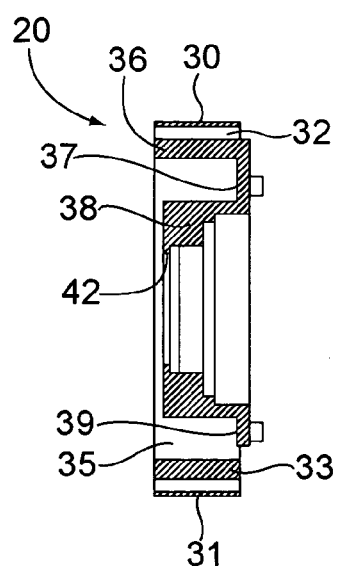
FIG. 7 is a cross sectional view taken along VII-VII line shown in FIG. 6.

The stage apparatus 20 is provided inside the Y-direction deformable body YU with a support member (horizontal support plate) 33 which is elongated rightward as viewed in FIG. 3 along the X-direction from an inner side surface of the movable support side-member 32 in the vicinity of the lower end thereof. Accordingly, the support member 33 is formed like a cantilever which extends from the movable support side-member 32. The fixed end (left end as viewed in FIG. 3) of the support member 33 serves as a joint portion (support member joint portion) 33a which joins the support member 33 to the movable support side-member 32, and a pair of Y-direction leaf springs (right and left resilient leaves) 34 and 35 are elongated upward in the Y-direction from opposite ends of an upper surface of the support member 33 except the joint portion 33a, respectively. Upper ends of the pair of Y-direction leaf springs 34 and 35 are connected to each other by a connecting member (horizontal connecting plate) 36 which is elongated in the X-direction. The thickness of each Y-direction leaf spring 34 and 35 in the X-direction is smaller than the thickness of each of the support member 33 and the connecting member 36 in the Y-direction. The support member 33 and the connecting member 36 are not resiliently deformable, whereas each of the pair of Y-direction leaf springs 34 and 35 is resiliently deformable in the X-direction. The support member 33, the pair of Y-direction leaf springs 34 and 35 and the connecting member 36 constitute an X-direction deformable body XU.

The X-direction deformable body XU is provided on an inner surface of the connecting member 36 with an upper mounting portion 37 which extends downward from the connecting member 36 in the Y-direction to be positioned inside of the X-direction deformable body XU. The X-direction deformable body XU is further provided at a lower end of the upper mounting portion 37 with an support enclosure 38 which extends downward from the upper mounting portion 37 in the Y-direction. The support enclosure 38 has a substantially square shape as viewed from the front of the stage apparatus 20. A lower mounting portion 39 is fixed to the bottom end of the support enclosure 38. The upper mounting portion 37 and the lower mounting portion 39 lie in a plane parallel to both the X-direction and the Y-direction, i.e., parallel to an X and Y plane. The upper mounting portion 37 is provided with two fixing holes (through holes) 40, and the lower mounting portion 39 is provided with two fixing holes (through holes) 41. The support enclosure 38 is formed in the shape of a box, the rear end of which is fully open. The support enclosure 38 is provided, on a front wall thereof at the center of the front wall, with a rectangular aperture 42.

The pair of spacers 21 and 22, the X-direction deformable body XU, the Y-direction deformable body YU, the mounting portion 37, an support enclosure 38 and the lower mounting portion 39 constitute the stage apparatus 20. The entire the stage apparatus 20 can be molded as one body by injection molding using a molding die (not shown).

Figure 8:
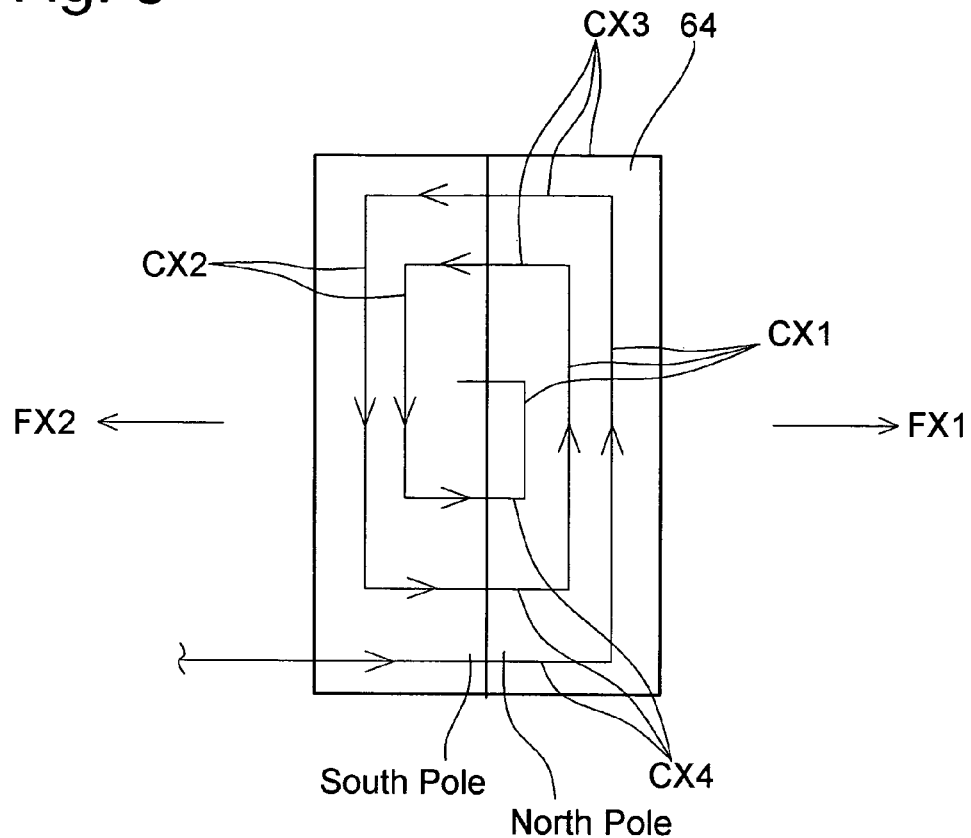
FIG. 8 is an X-direction planar drive coil and an X-direction magnet MX, showing the positional relationship therebetween.
Figure 9:
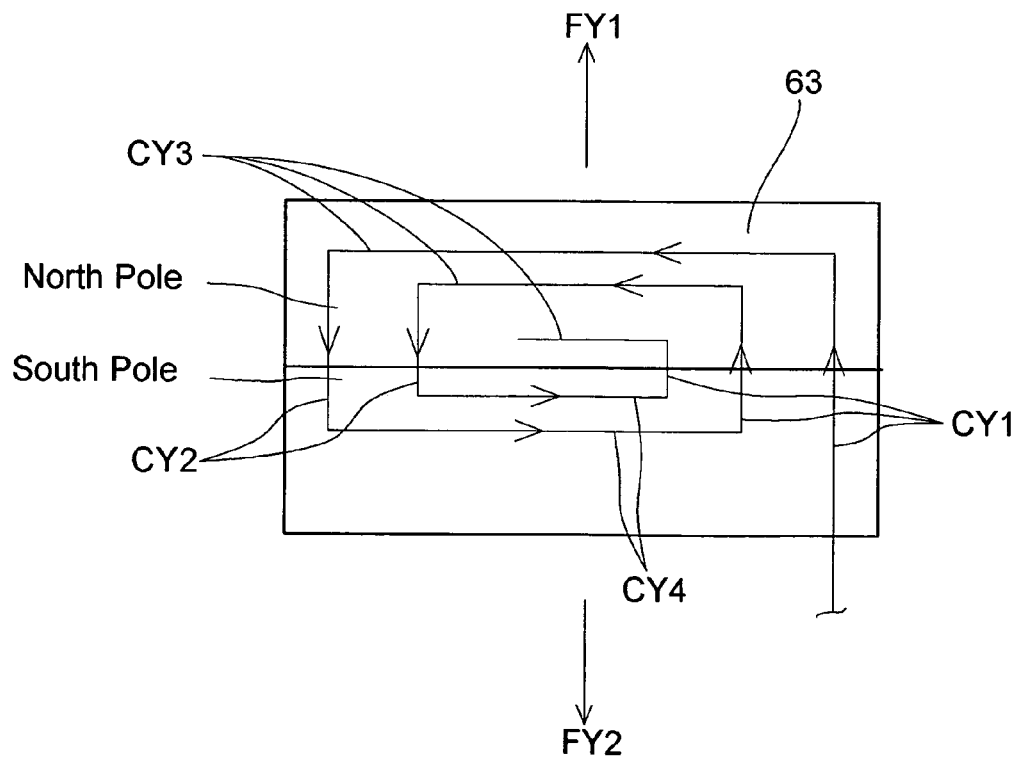
FIG. 9 is a Y-direction planar drive coil and a Y-direction magnet MY, showing the positional relationship therebetween.

The camera shake correction apparatus 15 is provided in the support enclosure 38 with an optical low-pass filter 45 having a rectangular shape as viewed from the front of the camera shake correction apparatus 15. The optical low-pass filter 45 is fitted into the support enclosure 38 so that the front surface of the optical low-pass filter 45 faces the rectangular aperture 42. The image pickup device 11 is fitted into the support enclosure 38. The camera shake correction apparatus 15 is provided immediately behind the support enclosure 38 with a coil substrate 50 which is positioned parallel to the X-Y plane, a front surface of which is fixed to the support enclosure 38. The image pickup device 11 is fixed to a central portion of the front surface of the coil substrate 50. The coil substrate 50 and the stage apparatus 20 are fixed to each other as one body by four set screws (not shown) which are screwed into four female screw holes 51 on the coil substrate 50 through the four fixing holes 40 and 41 of the stage apparatus 20, respectively. An upper projection 52 and a right projection 53 project from an upper end and a right end of the coil substrate 50, respectively. An X-direction Hall element (X-direction position sensor/an element of a controller) 54 is fixed to a front surface of the upper projection 52, while a Y-direction Hall element (Y-direction position sensor/an element of the controller) 55 is fixed to a front surface of the right projection 53. An X-direction planar drive coil CX is fixed to a front surface of the upper projection 52. The X-direction planar drive coil CX is, e.g., printed as a printed coil pattern on a front surface of the upper projection 52. Likewise, a Y-direction planar drive coil CY is fixed to a front surface of the right projection 53. The Y-direction planar drive coil CY is, e.g., printed as a printed coil pattern on a front surface of the right projection 53. The X-direction planar drive coil CX and the Y-direction planar drive coil CY have more than one-hundred turns, and lie in a plane parallel to both the X-direction and the Y-direction, i.e., parallel to an X-Y plane. FIGS. 8 and 9 schematically show the planar shapes of the X-direction planar drive coil CX and the Y-direction planar drive coil CY, respectively. As shown in FIG. 8, the X-direction planar drive coil CX is rectangularly coiled and is defined by linear right sides CX1, linear left sides CX2, linear upper sides CX3 and linear lower sides CX4. As shown in FIG. 9, the Y-direction planar drive coil CY is rectangularly coiled and is defined by linear right sides CY1, linear left sides CY2, linear upper sides CY3 and linear lower sides CY4.

The camera shake correction apparatus 15 is provided with two yoke members: a planar L-shaped front yoke 60 and a planar L-shaped rear yoke 65 positioned behind the front yoke 60. These two yoke members are made of magnetic substance such as iron, have the same shape and size, and are parallel to an X-Y plane. The camera shake correction apparatus 15 is provided, on a rear surface of an X-direction plate portion 61 of the front yoke 60 that faces an X-direction plate portion 66 of the rear yoke 65, with a first plate magnet (permanent magnet) 63 which is fixed to the rear surface of the X-direction plate portion 61. The camera shake correction apparatus 15 is further provided, on a rear surface of a Y-direction plate portion 62 of the front yoke 60 that faces a Y-direction plate portion 67 of the rear yoke 65, with a second plate magnet (permanent magnet) 64 which is fixed to the rear surface of the Y-direction plate portion 62. The first plate magnet 63 includes an N-pole and an S-pole which are aligned in the Y-direction, and the second plate magnet 64 includes an N-pole and an S-pole which are aligned in the X-direction. As shown in FIG. 8, the linear right sides CX1 of the X-direction planar drive coil CX are opposed to the N-pole of the second plate magnet 64 at all times in a Z-direction orthogonal to both the X and Y directions, i.e., in a forward/rearward direction of the camera shake correction apparatus 15, and the linear left sides CX2 of the X-direction planar drive coil CX are opposed to the S-pole of the second plate magnet 64 at all times in the Z-direction. As shown in FIG. 9, the linear upper sides CY3 of the Y-direction planar drive coil CY are opposed to the N-pole of the first plate magnet 63 at all times in the Z-direction, and the linear lower sides CY4 of the Y-direction planar drive coil CY are opposed to the S-pole of the first plate magnet 63 at all times in the Z-direction.

The X-direction Hall element 54 is adopted to detect a variation in magnetic flux in the vicinity of the border between the N-pole and the S-pole of the first plate magnet 63 to obtain information on the position of the coil substrate 50 in the X-direction, and the Y-direction Hall element 55 is adopted to detect a variation in magnetic flux in the vicinity of the border between the N-pole and the S-pole of the second plate magnet 64 to obtain information on the position of the coil substrate 50 in the Y-direction. The Y-direction plate portion 62 of the front yoke 60 is engaged in the pair of front mounting recesses 25 and 26 of the stage apparatus 20 to be fixed thereto, and the Y-direction plate portion 67 of the rear yoke 65 is engaged in the pair of rear mounting recesses 27 and 28 of the stage apparatus 20 to be fixed thereto. The X-direction plate portion 61 of the front yoke 60 and the X-direction plate portion 66 of the rear yoke 65 are positioned above the upper X-direction leaf spring 30 of the stage apparatus 20 to be elongated in the X-direction and to face each other in the Z-direction with the top projection 52 of the coil substrate 50 being positioned between the X-direction plate portion 61 and the X-direction plate portion 66, and a Y-direction magnetic circuit is formed between the X-direction plate portion 66 and the combination of the X-direction plate portion 61 and the first plate magnet 63. Left ends of the X-direction plate portion 61 and the X-direction plate portion 66 are connected to each other by a connector piece 68 made of synthetic resin. The Y-direction plate portion 62 of the front yoke 60 and the Y-direction plate portion 67 of the rear yoke 65 are positioned to be elongated in the Y-direction and to face each other in the Z-direction, and an X-direction magnetic circuit is formed between the Y-direction plate portion 62 and a combination of the Y-direction plate portion 67 and the second plate magnet 64.

The front yoke 60, the second plate magnet 64, the rear yoke 65 constitute an X-direction magnetic power generator, and the front yoke 60, the first plate magnet 63, the rear yoke 65 constitute a Y-direction magnetic power generator. The X-direction magnetic power generator and the X-direction planar drive coil CX constitute an X-direction actuator, and the Y-direction magnetic power generator and the Y-direction planar drive coil CY constitute a Y-direction actuator.

The X-direction planar drive coil CX is always positioned in the magnetic field of the second plate magnet 64, and the Y-direction planar drive coil CY is always positioned in the magnetic field of the first plate magnet 63.

All the elements shown in FIGS. 2 through 9 which have been described above and the controller which will be discussed later constitute the camera shake correction apparatus 15.

Operations of the first embodiment of the camera shake correction apparatus 15 will be hereinafter discussed with reference to the block diagram shown in FIG. 10.

The camera shake correction apparatus 15 performs a shake correction operation (image stabilizing operation) so as to offset image shake caused by deflections (angular deflections) of the optical axis O of the photographing optical system which are caused by hand shake of a photographer. Such deflections of the optical axis O are detected as two separate components: the X-direction component and the Y-direction component by an X-direction angular velocity sensor (shake detection sensor) 201 and a Y-direction angular velocity sensor (shake detection sensor) 202 which are incorporated in the digital camera 10, respectively.

In a photographing operation carried out by the digital camera 10, light transmitted through the lenses L1 through L3 is converged onto the imaging surface 12 of the image pickup device 11 through the rectangular aperture 42 and the optical low-pass filter 45 to form an image on the imaging surface 12. If a camera shake correction switch (not shown) of the digital camera 10 is ON during the photographing operation, output of the X-direction angular velocity sensor 201 and the Y-direction angular velocity sensor 202 are integrated by integrating circuits (elements of the controller) 203 and 204 to be converted into an X-direction deflection amount and a Y-direction deflection amount of the optical axis O, respectively. The output (deflection amount of the digital camera 10) of the integrating circuit 203 and the output of the X-direction Hall element 54 are compared with each other in an error amplifier (an element of the controller) 205, and subsequently the error amplifier 205 applies a voltage which corresponds to an output difference between the integrating circuit 203 and the X-direction Hall element 54 to the X-direction planar drive coil CX to drive the image pickup device 11 in a manner to reduce the output difference. Similarly, the output of the integrating circuit 204 and the output of the Y-direction Hall element 55 are compared with each other in an error amplifier (an element of the controller) 206, and subsequently the error amplifier 206 applies a voltage which corresponds to an output difference between the integrating circuit 204 and the Y-direction Hall element 55 to the Y-direction planar drive coil CY to drive the image pickup device 11 in a manner to reduce the output difference. Namely, the image pickup device 11 is driven in the X and Y directions in response to deflections (deflection amount) of the optical axis O to correct image shake on the image pickup device 11 (i.e. to stabilize an object image formed on the imaging surface 12) which is caused by hand shake.

The image pickup device 11 is driven in the X and Y directions in the following manner.

Figure 11:
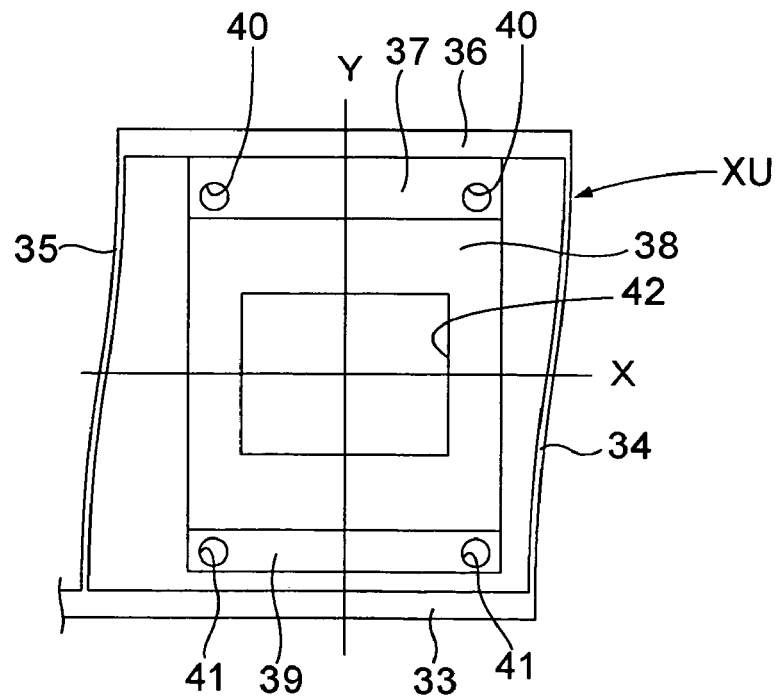
FIG. 11 is a front elevational view of an X-direction deformable body, showing an operative state (resiliently deformed state) thereof.

If the error amplifier 205 supplies an electric current only to the X-direction planar drive coil CX in a specific direction (counterclockwise direction) shown by arrows in FIG. 8, a rightward linear force FX1 (see FIG. 8) in the X-direction is produced in the linear right sides CX1 and the linear left sides CX2 due to the magnetic force produced by the X-direction magnetic circuit provided between the Y-direction plate portion 67 and a combination of the Y-direction plate portion 62 and the second plate magnet 64. Note that forces are produced also in the linear upper sides CX3 and the linear lower sides CX4 at this time; however, these forces cancel each other out. Thereupon, each of the pair of Y-direction leaf springs 34 and 35 is resiliently deformed in the shape of a letter S as viewed in the Z-direction so that the connecting member 36 substantially linearly moves rightward in the X-direction relative to the support member 33 within a range of movement in which the connecting member 36 does not come in contact with either the stationary support side-member 29 or the movable support side-member 32, and accordingly, the coil substrate 50 and the image pickup device 11 substantially linearly move rightward. For reference purposes, FIG. 11 shows an operative state (resiliently deformed state) of the X-direction deformable body XU in which each of the pair of Y-direction leaf springs 34 and 35 is resiliently deformed in the shape of a letter S (the amount of deformation of each Y-direction leaf spring 34 and 35 is exaggerated in FIG. 11 for the purpose of illustration). On the other hand, if the error amplifier 205 supplies an electric current only to the X-direction planar drive coil CX in the direction (clockwise direction) opposite to the direction shown by arrows shown in FIG. 8, a leftward linear force FX2 (see FIG. 8) in the X-direction is produced in the linear right sides CX1 and the linear left sides CX2 due to the magnetic force produced by the X-direction magnetic circuit. Note that forces are produced also in the linear upper sides CX3 and the linear lower sides CX4 at this time; however, these forces cancel each other out. Thereupon, each of the pair of Y-direction leaf springs 34 and 35 is resiliently deformed in the shape of a letter S as viewed in the Z-direction so that the connecting member 36 substantially linearly moves leftward in the X-direction relative to the support member 33 within a range of movement in which the connecting member 36 does not come in contact with either the stationary support side-member 29 or the movable support side-member 32, and accordingly, the coil substrate 50 and the image pickup device 11 substantially linearly move leftward.

Figure 10:
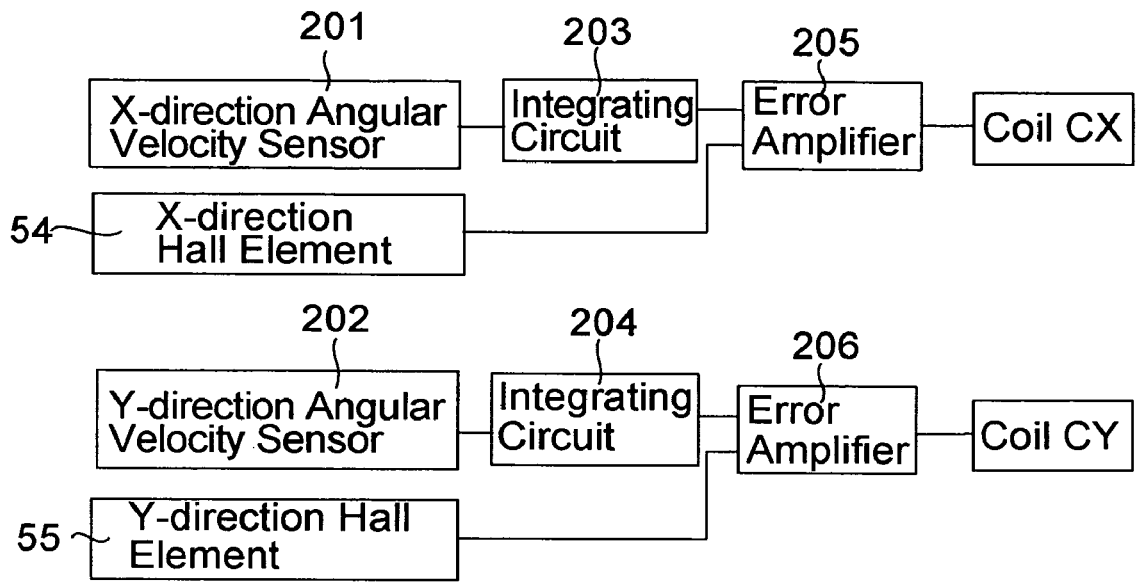
FIG. 10 is a block diagram of a control circuit.

Although the connecting member 36 moves in the X-direction not exactly linearly but substantially linearly with a slight displacement in the Y-direction when the error amplifier 205 supplies an electric current only to the X-direction planar drive coil CX as described above, image shake is properly corrected in practice because such a displacement in the Y-direction is detected by a control circuit (controller) shown in FIG. 10 using the Y-direction Hall element 55 so that the Y-direction planar drive coil CY is also supplied with an electric current to offset such a displacement in the Y-direction.

Similar to the case when the error amplifier 205 supplies an electric current only to the X-direction planar drive coil CX, if the error amplifier 206 supplies an electric current only to the Y-direction planar drive coil CY in a specific direction (counterclockwise direction) shown by arrows in FIG. 9, an upward linear force FY1 (see FIG. 9) in the Y-direction is produced in the linear upper sides CY3 and the linear lower sides CY4 due to the magnetic force produced by the Y-direction magnetic circuit provided between the X-direction plate portion 66 and a combination of the X-direction plate portion 61 and the first plate magnet 63. Note that forces are produced also in the linear right sides CY1 and the linear left sides CY2 at this time; however, these forces cancel each other out. Thereupon, each of the pair of X-direction leaf springs 30 and 31 is resiliently deformed in the shape of a letter S as viewed along the Z-direction so that the movable support side-member 32 substantially linearly moves upward in the Y-direction relative to the stationary support side-member 29 within a range of movement in which the movable support side-member 32 does not come in contact with the camera body, and accordingly, the coil substrate 50 and the image pickup device 11 substantially linearly move upward. On the other hand, if the error amplifier 206 supplies an electric current only to the Y-direction planar drive coil CY in the direction (clockwise direction) opposite to the direction shown by arrows shown in FIG. 9, a downward linear force FY2 (see FIG. 9) in the Y-direction is produced in the linear upper sides CY3 and the lower left sides CY4 due to the magnetic force produced by the Y-direction magnetic circuit. Note that forces are produced also in the linear right sides CY1 and the linear left sides CY2 at this time; however, these forces cancel each other out. Thereupon, each of the pair of X-direction leaf springs 30 and 31 is resiliently deformed in the shape of a letter S as viewed along the Z-direction so that the movable support side-member 32 substantially linearly moves downward in the Y-direction relative to the stationary support side-member 29 within a range of movement in which the movable support side-member 32 does not come in contact with the camera body, and accordingly, the coil substrate 50 and the image pickup device 11 substantially linearly move downward.

Although the connecting member 36 moves in the Y-direction not exactly linearly but substantially linearly with a slight displacement in the X-direction when the error amplifier 206 supplies an electric current only to the Y-direction planar drive coil CY as described above, image shake is properly corrected in practice because such a displacement in the X-direction is detected by the control circuit (controller) shown in FIG. 10 using the X-direction Hall element 54 so that the X-direction planar drive coil CX is also supplied with an electric current to offset such a displacement in the X-direction.

Accordingly, image shake caused by hand shake is corrected by variations in position of the image pickup device 11 in the X and Y directions in accordance with movements of the coil substrate 50 in the X and Y directions.

The stage apparatus 20 that is incorporated in the above described embodiment of the camera shake correction apparatus can be produced easily and at a low cost of production because the stage apparatus 20 can be formed as one body by injection molding. Moreover, the Y-direction deformable body YU and the X-direction deformable body XU are resiliently deformable smoothly without interfering with each other because the joint portion 33a, which joins the support member 33 to the movable support side-member 32, forms a clearance between the Y-direction deformable body YU and the X-direction deformable body XU.

Furthermore, the structure of the camera shake correction apparatus 15 is simple because the X-direction planar drive coil CX, the Y-direction planar drive coil CY, the X-direction Hall element 54 and the Y-direction Hall element 55 are all mounted on the coil substrate 50 which is integral with the stage apparatus 20.

Figure 12:
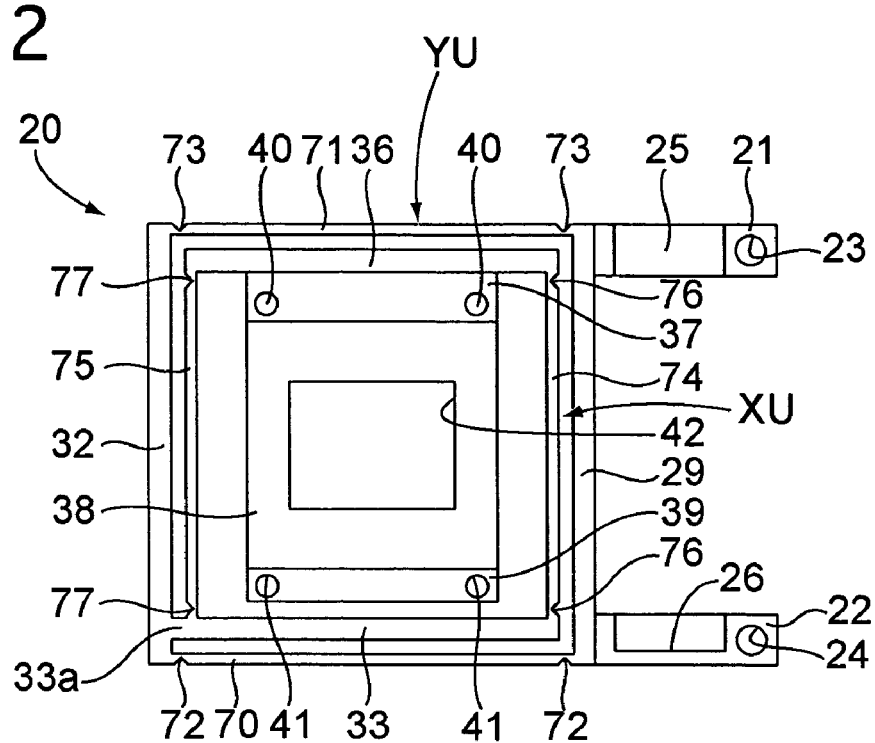
FIG. 12 is a view similar to that of FIG. 6, showing a first modification of the stage apparatus.
Figure 13:
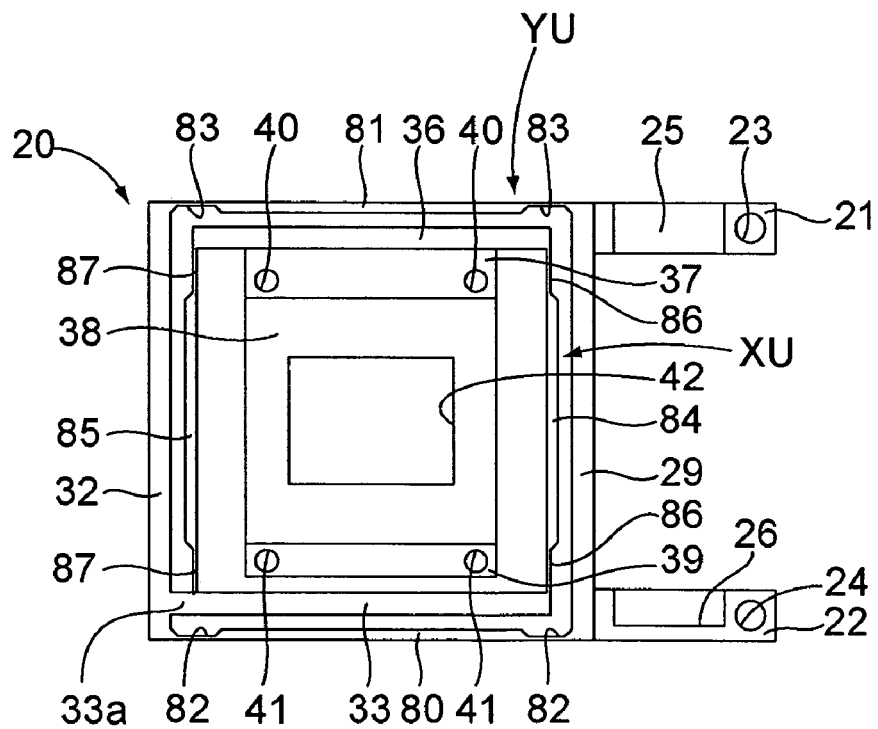
FIG. 13 is a view similar to that of FIG. 6, showing a second modification of the stage apparatus.
Figure 14:
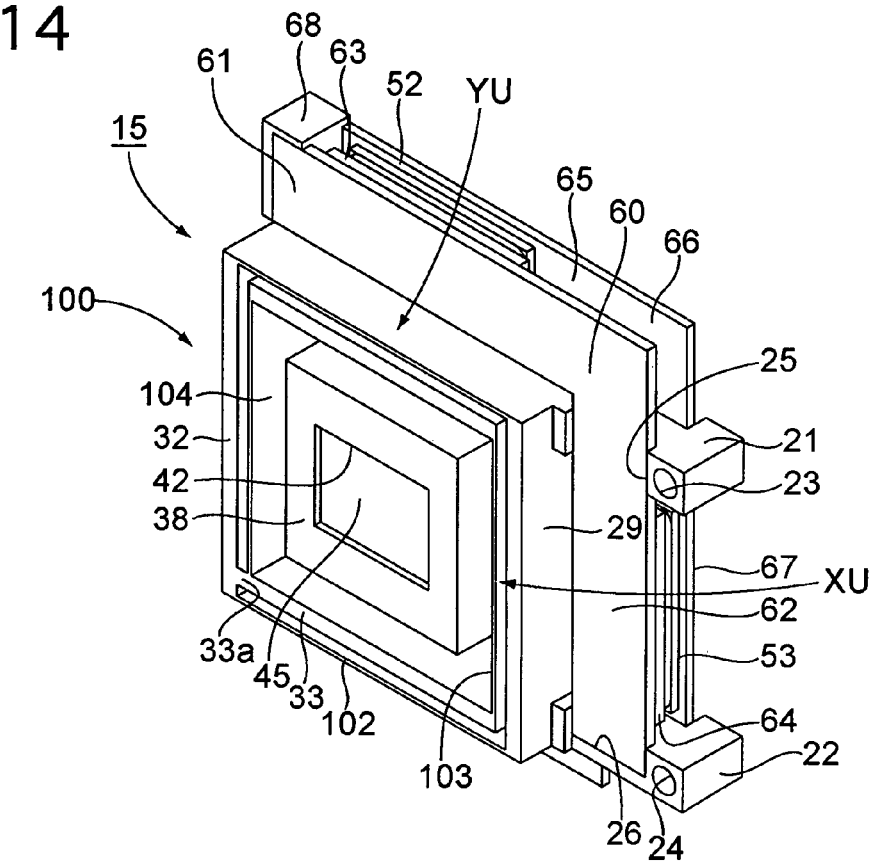
FIG. 14 is a perspective view of a second embodiment of the camera shake correction apparatus.
Figure 17:
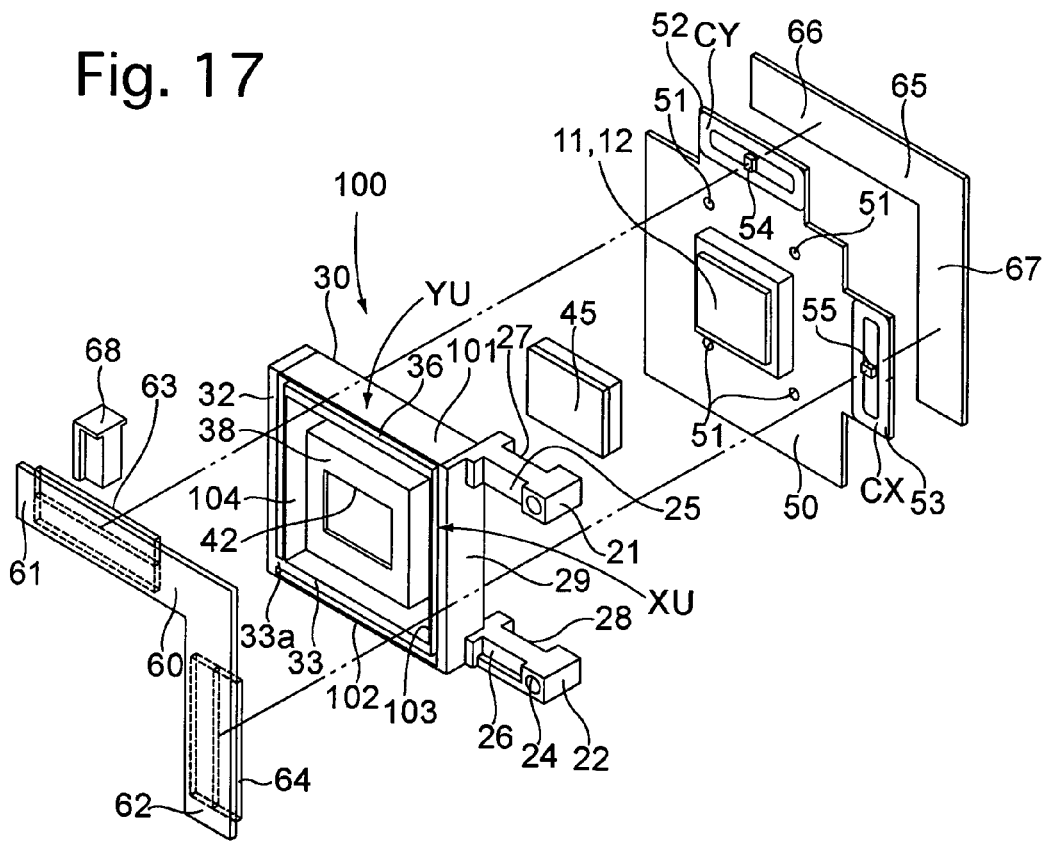
FIG. 17 is an exploded perspective view of the camera shake correction apparatus shown in FIG. 14.
Figure 15:
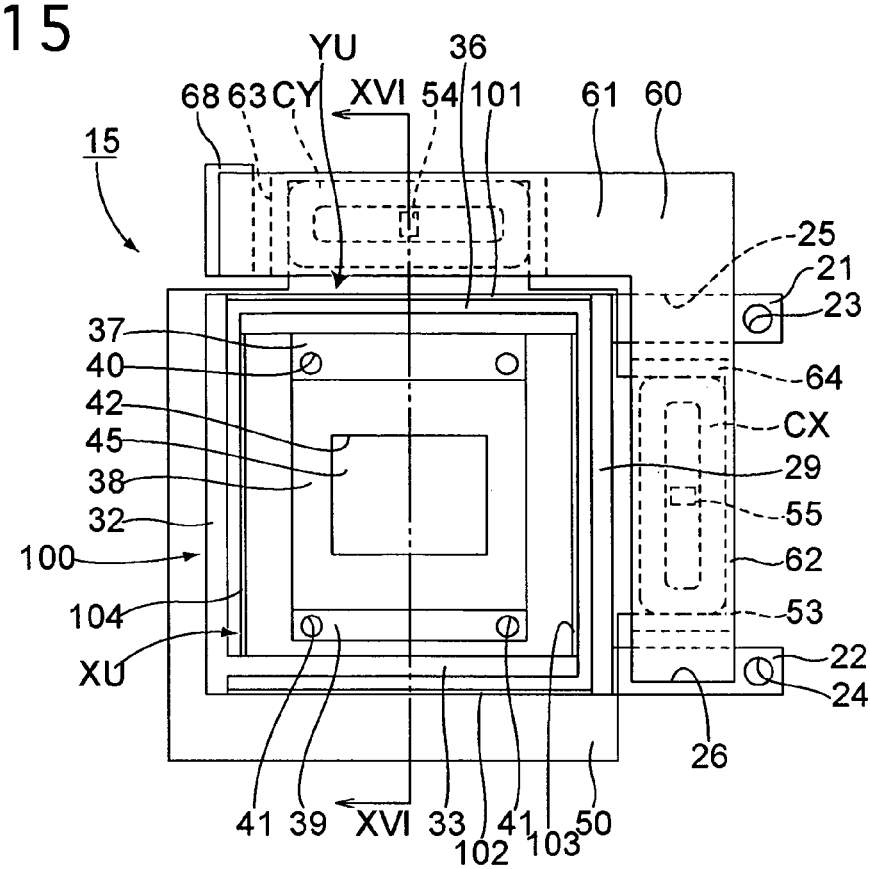
FIG. 15 is a front elevational view of the camera shake correction apparatus shown in FIG. 14.
Figure 16:
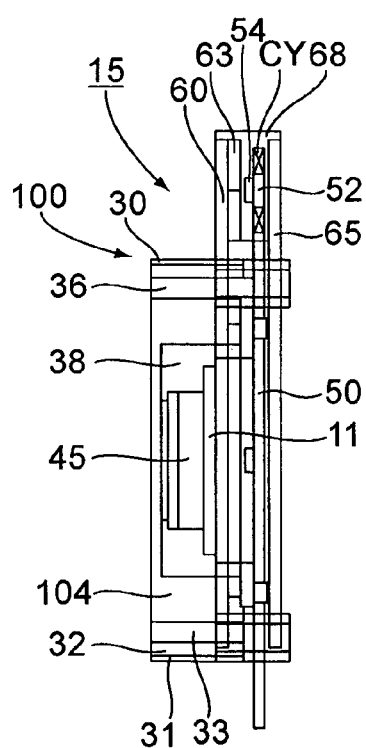
FIG. 16 is a cross sectional view taken along XVI-XVI line shown in FIG. 15.
Figure 18:
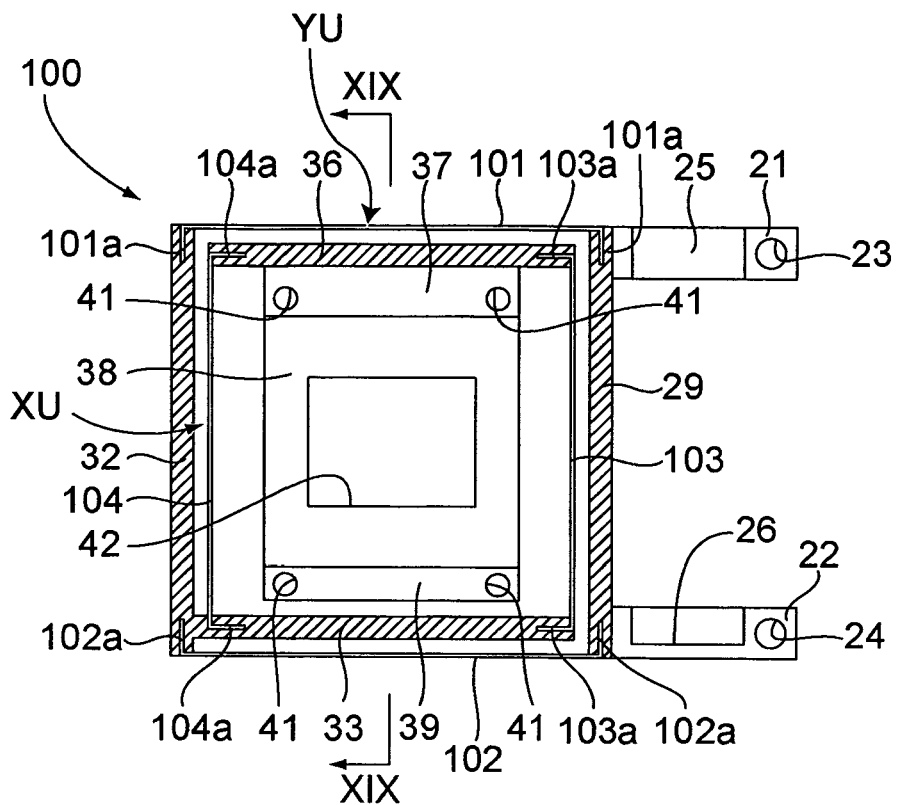
FIG. 18 is a cross sectional view of a stage apparatus incorporated in the second embodiment of the camera shake correction apparatus.
Figure 19:
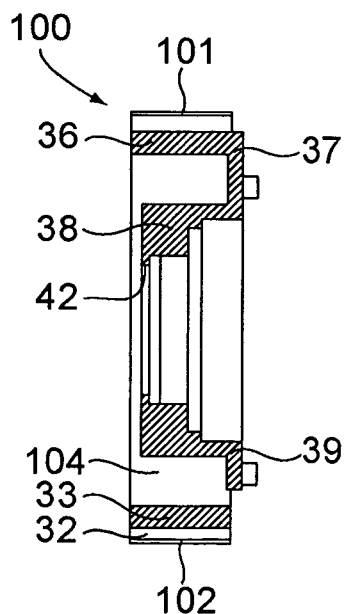
FIG. 19 is a cross sectional view taken along XIX-XIX line shown in FIG. 18.

The stage apparatus 20 can be modified as shown in FIGS. 12 and 13. FIG. 12 shows a first modification of the stage apparatus 20, and FIG. 13 shows a second modification of the stage apparatus 20.

In the stage apparatus 20 shown in FIG. 12, the thickness of each of a pair of X-direction leaf springs 70 and 71 (which respectively correspond to the pair of X-direction leaf springs 30 and 31) in the Y-direction is smaller than the thickness of each of the stationary support side-member 29 and the movable support side-member 32 in the X-direction, the lower X-direction leaf spring 70 is provided, at both ends thereof in the X-direction which are connected to the stationary support side-member 29 and the movable support side-member 32, with two Z-direction grooves 72, respectively, which are elongated in the Z-direction from the front end to the rear end of the upper X-direction leaf spring 71, and the upper X-direction leaf spring 71 is provided, at both ends thereof in the X-direction which are connected to the stationary support side-member 29 and the movable support side-member 32, with two Z-direction grooves 73, respectively, which are elongated in the Z-direction from the front end to the rear end of the upper X-direction leaf spring 71. As can be seen in FIG. 12, each Z-direction groove 72 and 73 has a V-shaped cross section. Due to this structure, the lower X-direction leaf spring 70 can be easily deformed in the Y-direction, especially at each Z-direction groove 72, while the upper X-direction leaf spring 71 can be easily deformed in the Y-direction, especially at each Z-direction groove 73. Moreover, the thickness of each of a pair of Y-direction leaf springs 74 and 75 (which respectively correspond to the pair of Y-direction leaf springs 34 and 35) in the X-direction is smaller than the thickness of each of the support member 33 and the connecting member 36 in the Y-direction. The right Y-direction leaf spring 74 is provided, at both ends thereof in the Y-direction which are connected to the support member 33 and the connecting member 36, with two Z-direction grooves 76, respectively, which are elongated in the Z-direction from the front end to the rear end of the right X-direction leaf spring 74. The left Y-direction leaf spring 75 is provided, at both ends thereof in the Y-direction which are connected to the support member 33 and the connecting member 36, with two Z-direction grooves 77, respectively, which are elongated in the Z-direction from the front end to the rear end of the left X-direction leaf spring 75. As can be seen in FIG. 12, each Z-direction groove 76 and 77 has a V-shaped cross section. Due to this structure, the right Y-direction leaf spring 74 can be easily deformed in the X-direction, especially at each Z-direction groove 76, while the left Y-direction leaf spring 75 can be easily deformed in the X-direction, especially at each Z-direction groove 77. In the stage apparatus 20 shown in FIG. 12, the stationary support side-member 29, the pair of X-direction leaf springs 70 and 71 and the movable support side-member 32 constitute the Y-direction deformable body YU, and the support member 33, the pair of Y-direction leaf springs 74 and 75 and the connecting member 36 constitute the X-direction deformable body XU.

Similar to the stage apparatus 20 shown in FIGS. 2 through 7, the stage apparatus 20 shown in FIG. 12 can be made at a low cost of production because the stage apparatus 20 shown in FIG. 12 can also be formed as one body by injection molding. In the stage apparatus 20 shown in FIG. 12, the stage apparatus 20 can be easily molded by injection molding because each of the four leaf springs 70, 71, 74 and 75 does not have to be formed excessively thin except for the portions of the four leaf springs 70, 71, 74 and 75 at which the V-shaped Z-direction grooves 72, 73, 76 and 77 are formed.

FIG. 13 shows a second modification of the stage apparatus 20. In this stage apparatus 20 shown in FIG. 13, the thickness of each of a pair of X-direction leaf springs 80 and 81 (which respectively correspond to the pair of X-direction leaf springs 30 and 31) in the Y-direction is smaller than the thickness of each of the stationary support side-member 29 and the movable support side-member 32 in the X-direction, both ends 82 (which are respectively connected to the stationary support side-member 29 and the movable support side-member 32) of the lower X-direction leaf spring 80 are smaller in thickness than a middle portion of the lower X-direction leaf spring 80, and both ends 83 (which are respectively connected to the stationary support side-member 29 and the movable support side-member 32) of the upper X-direction leaf spring 81 are smaller in thickness than a middle portion of the upper X-direction leaf spring 81. Due to this structure, each of the pair of X-direction leaf springs 80 and 81 can be easily deformed in the Y-direction, especially at both ends 82 and 83 thereof. Moreover, the thickness of each of a pair of Y-direction leaf springs 84 and 85 (which respectively correspond to the pair of Y-direction leaf springs 34 and 35) in the X-direction is smaller than the thickness of each of the support member 33 and the connecting member 36 in the Y-direction, both ends 86 (which are respectively connected to the support member 33 and the connecting member 36) of the right Y-direction leaf spring 84 are smaller in thickness than a middle portion of the right Y-direction leaf spring 84, and both ends 87 (which are respectively connected to the support member 33 and the connecting member 36) of the left Y-direction leaf spring 85 are smaller in thickness than a middle portion of the left Y-direction leaf spring 85. Due to this structure, each of the pair of Y-direction leaf springs 84 and 85 can be easily deformed in the X-direction, especially at both ends 86 or 87 thereof. In the stage apparatus 20 shown in FIG. 13, the stationary support side-member 29, the pair of X-direction leaf springs 80 and 81 and the movable support side-member 32 constitute the Y-direction deformable body YU, and the support member 33, the pair of Y-direction leaf springs 84 and 85 and the connecting member 36 constitute the X-direction deformable body XU.

Similar to the stage apparatus 20 shown in FIGS. 2 through 7, the stage apparatus 20 shown in FIG. 13 can be made at a low cost of production because the stage apparatus 20 shown in FIG. 13 can also be formed as one body by injection molding. In the stage apparatus 20 shown in FIG. 13, the stage apparatus 20 can be easily molded by injection molding because each of the four leaf springs 80, 81, 84 and 85 does not have to be formed excessively thin except for the portions of the four leaf springs 80, 81, 84 and 85 at which the ends 82, 83, 86 and 87 are formed.

A second embodiment of the camera shake correction apparatus (image stabilizer) according to the present invention will be hereinafter discussed with reference to FIGS. 14 through 19. Elements and portions of this embodiment of the camera shake correction apparatus which are similar to those of the first embodiment of the camera shake correction apparatus are designated by the same reference numerals, and detailed descriptions of such similar elements and portions are omitted from the following descriptions.

The second embodiment of the camera shake correction apparatus is identical to the first embodiment of the camera shake correction apparatus except that a stage apparatus 100 in the second embodiment of the camera shake correction apparatus is different in structure from the stage apparatus 20 in the first embodiment of the camera shake correction apparatus, and accordingly, only the stage apparatus 100 will be discussed thereinafter.

The stage apparatus 100 is provided with a pair of X-direction leaf springs 101 and 102 which are made of metal such as stainless steel, nickel silver or hard aluminum. Upper ends of the stationary support side-member 29 and the movable support side-member 32 are connected to each other by the upper X-direction leaf spring 101, and lower ends of the stationary support side-member 29 and the movable support side-member 32 are connected to each other by the lower X-direction leaf spring 102.

The stage apparatus 100 is provided with a pair of Y-direction leaf springs 103 and 104 which are made of metal such as stainless steel, nickel silver or hard aluminum. Right ends of the support member 33 and the connecting member 36 are connected to each other by the right Y-direction leaf spring 103, and left ends of the support member 33 and the connecting member 36 are connected to each other by the left Y-direction leaf spring 104.

Each of the pair of X-direction leaf springs 101 and 102 is resiliently deformable in the Y-direction, and each of the pair of Y-direction leaf springs 103 and 104 is resiliently deformable in the X-direction.

The stage apparatus 100 that has the above described structure can be formed by pouring melted synthetic resin into a molding die (not shown) in which the four leaf springs 101, 102, 103 and 104 are set in advance, i.e., can be formed as one body by insertion molding. If the stage apparatus 100 is formed by insertion molding, L-shaped bent ends 110a formed at opposite ends of the upper X-direction leaf spring 101 are embedded in the upper ends of the stationary support side-member 29 and the movable support side-member 32, respectively, L-shaped bent ends 102a formed at opposite ends of the lower X-direction leaf spring 102 are embedded in the lower ends of the stationary support side-member 29 and the movable support side-member 32, respectively, L-shaped bent ends 103a formed at opposite ends of the right Y-direction leaf spring 103 are embedded in the right ends of the support member 33 and the connecting member 36, respectively, and L-shaped bent ends 104a formed at opposite ends of the left Y-direction leaf spring 104 are embedded in the left ends of the support member 33 and the connecting member 36, respectively (see FIG. 18). In the stage apparatus 100 shown in FIGS. 14 through 19, the stationary support side-member 29, the pair of X-direction leaf springs 101 and 102, and the movable support side-member 32 constitute the Y-direction deformable body YU, and the support member 33, the pair of Y-direction leaf springs 103 and 104 and the connecting member 36 constitute the X-direction deformable body XU.

Similar to the above described operations of the first embodiment of the camera shake correction apparatus 15, operations of the second embodiment of the camera shake correction apparatus 15 in which the stage apparatus 100 is incorporated are controlled by the above described controller shown in FIG. 10.

If either a rightward linear force or a leftward linear force in the X-direction is produced in the X-direction planar drive coil CX that is fixed to the coil substrate 50 which is fixed to the support enclosure 38, each of the pair of Y-direction leaf springs 103 and 104 is resiliently deformed in the shape of a letter S as viewed in the Z-direction, so that the connecting member 36 substantially linearly moves in the X-direction relative to the support member 33 to correct camera shake in the X-direction. On the other hand, if either an upward linear force or a downward linear force in the Y-direction is produced in the Y-direction planar drive coil CY that is fixed to the coil substrate 50 which is fixed to the support enclosure 38, each of the pair of X-direction leaf springs 101 and 102 is resiliently deformed in the shape of a letter S as viewed in the Z-direction, so that the movable support side-member 32 substantially linearly moves in the Y-direction relative to the stationary support side-member 29 to correct camera shake in the Y-direction.

Similar to the stage apparatus 20 that is incorporated in the above described first embodiment of the camera shake correction apparatus, the stage apparatus 100 that is incorporated in the above described second embodiment of the camera shake correction apparatus can be produced easily and at a low cost of production because the stage apparatus 100 can be formed as one body by insertion molding. Moreover, the Y-direction deformable body YU and the X-direction deformable body XU are resiliently deformable smoothly without interfering with each other because the joint portion 33a, which joins the support member 33 to the movable support side-member 32, forms a clearance between the Y-direction deformable body YU and the X-direction deformable body XU.

Figure 20:
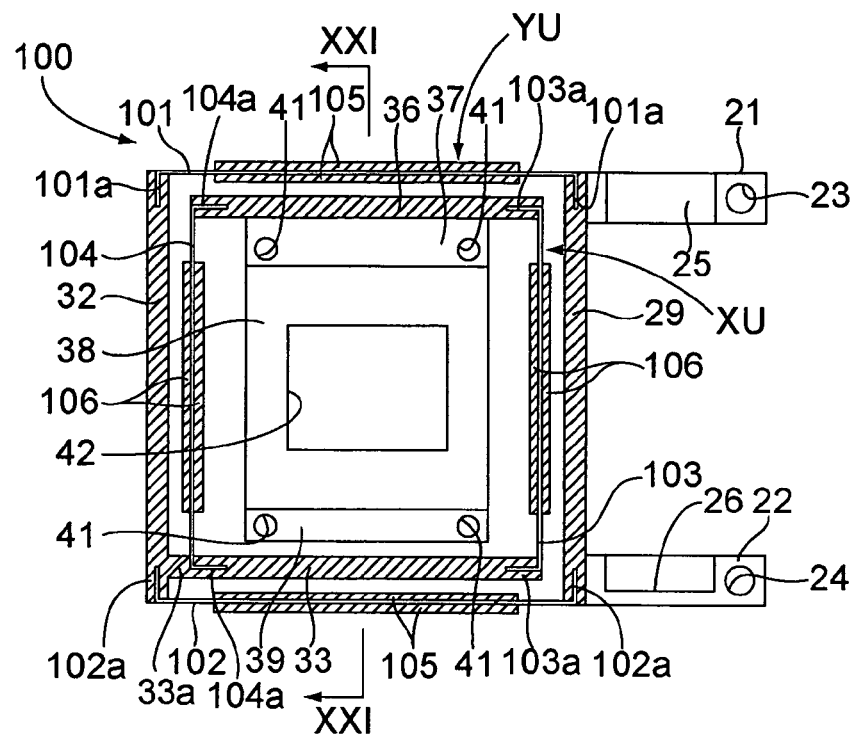
FIG. 20 is view similar to that of FIG. 18, showing a first modification of the stage apparatus incorporated in the second embodiment of the camera shake correction apparatus.
Figure 21:
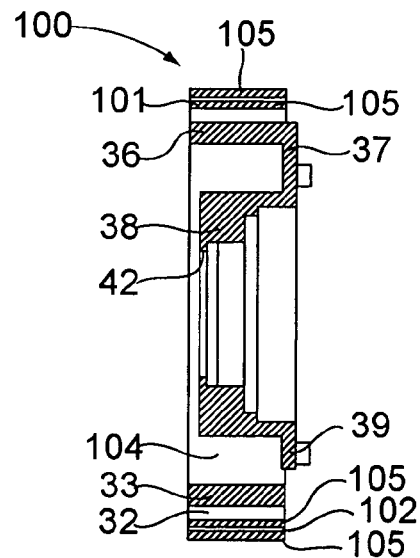
FIG. 21 is a cross sectional view taken along XXI-XXI line shown in FIG. 20.
Figure 24:
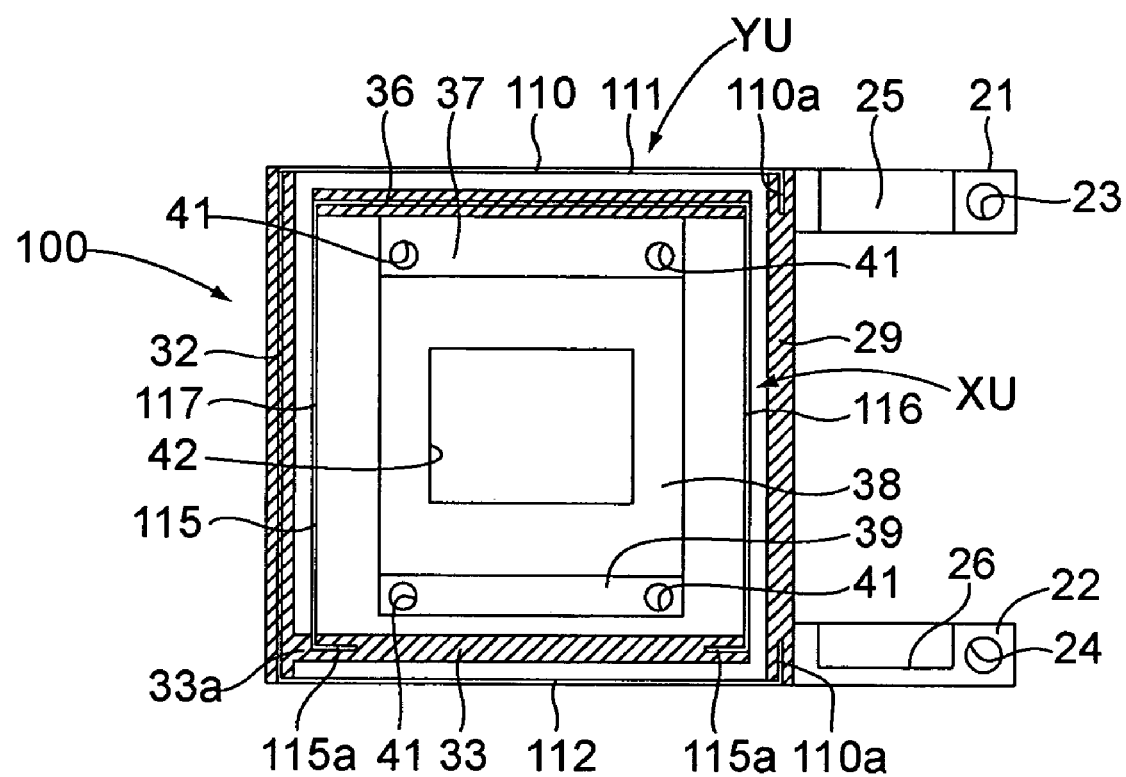
FIG. 24 is a cross sectional view of a second modification of the stage apparatus incorporated in the second embodiment of the camera shake correction apparatus.

The stage apparatus 100 can be modified as shown in FIGS. 20, 21 and 24. FIGS. 20 and 21 shows a first modification of the stage apparatus 100, and FIG. 24 shows a second modification of the stage apparatus 100.

In the stage apparatus 100 shown in FIGS. 20 and 21, a reinforcing element (X-direction reinforcing member) 105 made of synthetic resin (the same as the aforementioned melted synthetic resin) is integrally formed on both sides of each X-direction leaf spring 101 and 102 except both end portions thereof, and a reinforcing element (Y-direction reinforcing member) 106 made of the same melted synthetic resin is integrally formed on both sides of each Y-direction leaf spring 103 and 104 except both end portions thereof. Each reinforcing element 105 and 106 can be integrally formed on each leaf spring 101, 102, 103 and 104 by insertion molding. In the stage apparatus 100 shown in FIGS. 20 and 21, the stationary support side-member 29, the pair of X-direction leaf springs 101 and 102, the movable support side-member 32 and the reinforcing elements 105 constitute the Y-direction deformable body YU, and the support member 33, the pair of Y-direction leaf springs 103 and 104, the connecting member 36 and the reinforcing elements 106 constitute the X-direction deformable body XU.

In the modification of the stage apparatus shown in FIGS. 20 and 21, the spring constant of each of the four leaf springs 101, 102, 103 and 104 can be properly adjusted by changing the length of each reinforcing element 105 and 106 in the lengthwise direction thereof. It is possible that each reinforcing element 105 and 106 be fixed to the associated leaf spring by adhesive.

Other advantages of the first modification of the stage apparatus 100 shown in FIGS. 20 and 21 will be discussed hereinafter.

Figure 22:
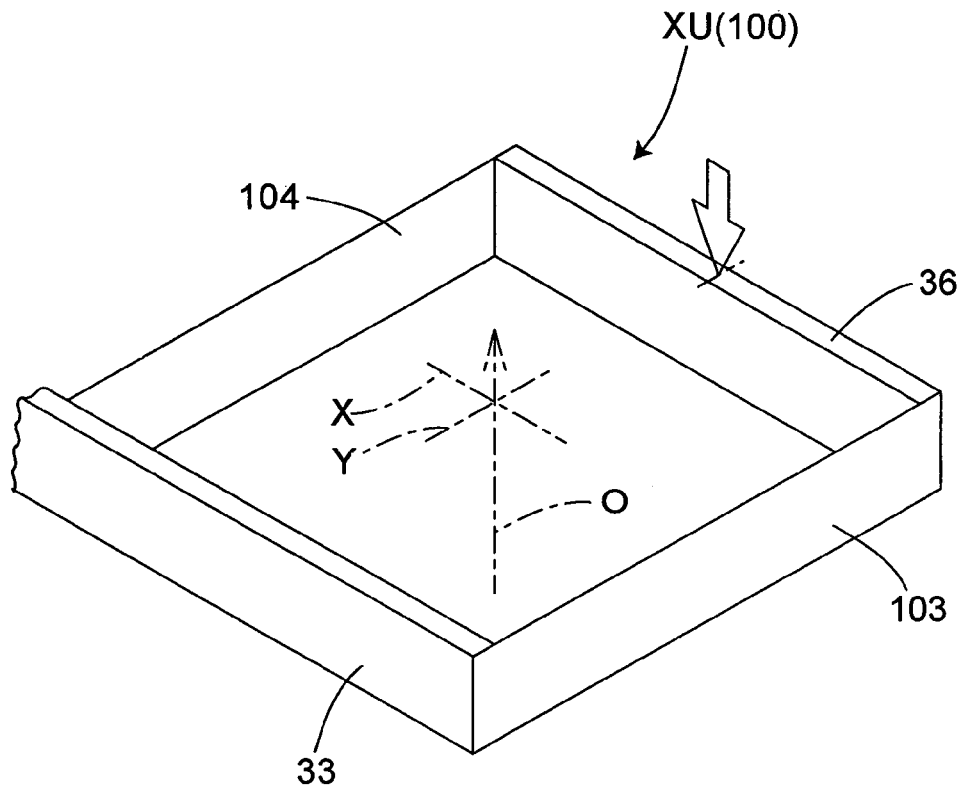
FIG. 22 is a perspective view of an X-direction deformable body provided in the second embodiment of the camera shake correction apparatus, showing the X-direction deformable body in a non-deformed state for the purpose of illustrating an advantage of the X-direction deformable body.
Figure 23:
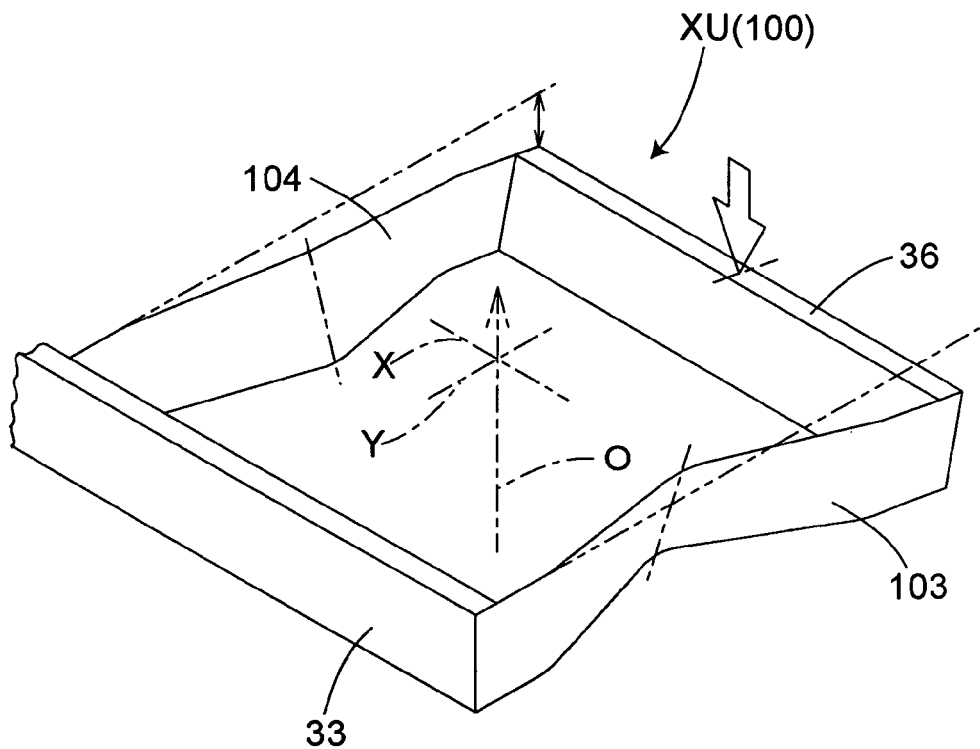
FIG. 23 is a view similar to that of FIG. 22, showing the X-direction deformable body shown in FIG. 22 in a deformed state for the purpose of illustrating an advantage of the X-direction deformable body.

If a large force in a direction parallel to the optical axis O which is caused by pointing the digital camera 10 so that the optical axis O extends in the vertical (upward/downward) direction, or by an impact given to the digital camera 10 if dropped on the floor is exerted on the movable support side-member 32 of the Y-direction deformable body YU and the connecting member 36 of the X-direction deformable body XU, the weight of the movable support side-member 32 is applied to the pair of X-direction leaf springs 101 and 102 as a load in the optical axis direction while the weight of the connecting member 36 is applied to the pair of Y-direction leaf springs 103 and 104 as a load in the optical axis direction. In this case, if the strength of a middle portion of each leaf spring 101, 102, 103 and 104 in the lengthwise direction thereof is small, such loads exert a great influence on the middle portion of each leaf spring 101, 102, 103 and 104. Namely, referring only to the X-direction deformable body XU, the shape of each of the pair of Y-direction leaf springs 103 and 104 remains unchanged as shown in FIG. 22 unless a load is applied thereto. However, once a load is applied, each Y-direction leaf spring 103 and 104 is bent and twisted at a middle portion thereof as shown in FIG. 23, which causes a displacement in the optical axis direction between the support member 33 and the connecting member 36. Such a displacement also occurs between the movable support side-member 32 and the stationary support side-member 29. Once such displacements occur, the imaging surface 12 of the image pickup device 11 does not lie in a plane perpendicular to the optical axis O (i.e., becomes inclined to the optical axis O), which makes it impossible to accurately capture desired object images.

However, if the reinforcing element 105, which increases the flexural rigidity EI (E: modulus of longitudinal elasticity; I: geometrical moment of inertia with respect to a neutral axis of a cross section) and the torsion rigidity GIp (G: modulus of transverse elasticity; Ip: polar moment of inertia of area with respect to a center of the cross section), is integrally formed on both sides of each X-direction leaf spring 101 and 102 except both end portions thereof (i.e., on a middle portion of each X-direction leaf spring 101 and 102), i.e., if the reinforcing element 105, which increases the aforementioned geometrical moment of inertia I and the aforementioned polar moment of inertia of area Ip of the middle portion of each X-direction leaf spring 101 and 102 to be greater than those of the both end portions of each X-direction leaf spring 101 and 102, is integrally formed on both sides of each X-direction leaf spring 101 and 102 except both end portions thereof, each X-direction leaf spring 101 and 102 can be prevented from being bent or twisted at a middle portion of each X-direction leaf spring 101 and 102. Note that each of the modulus of longitudinal elasticity E and the modulus of transverse elasticity G is constant at any point on each X-direction leaf spring 101 and 102. Therefore, it is possible to prevent an inclination of the imaging surface 12 of the image pickup device 11 with respect to the optical axis O which is to be caused by a twisting or a bending of each X-direction leaf spring 101 and 102 from occurring.

Likewise, the flexural rigidity EI and the torsion rigidity GIp of a middle portion of each Y-direction leaf spring 103 and 104 is greater than those of the both end portions of each Y-direction leaf spring 103 and 104 because the reinforcing element 106 is integrally formed on both sides of each Y-direction leaf spring 103 and 104 except both end portions thereof (i.e., on a middle portion of each Y-direction leaf spring 103 and 104). Note that each of the modulus of longitudinal elasticity E and the modulus of transverse elasticity G is constant at any point on each Y-direction leaf spring 103 and 104. Therefore, even if a great force in a direction parallel to the optical axis O is exerted on the movable support side-member 32 of the Y-direction deformable body YU, it is possible to prevent the middle portion of each Y-direction leaf spring 103 and 104 from being bent or twisted. Consequently, it is possible to prevent an inclination of the imaging surface 12 of the image pickup device 11 with respect to the optical axis O from occurring, caused by twisting or bending of each Y-direction leaf spring 103 and 104 except both end portions thereof.

Moreover, since each reinforcing element 105 and 106 is fixed only to a middle portion of the associated leaf spring 101, 102, 103 or 104, the increment of weight of the stage apparatus 100 is small, and accordingly, the response of the stage apparatus 100 is not decreased substantially.

The second modification of the stage apparatus 100 shown in FIG. 24 is provided with a first leaf spring 110 and a second leaf spring 115, each of which is formed in the shape of a substantially letter U as viewed from the front of the stage apparatus 100. Upper and lower leaf portions of the first U-shaped leaf spring 110 serve as a pair of X-direction leaf springs 111 and 112, respectively, and left and right leaf portions of the second U-shaped leaf spring 115 serve as a pair of Y-direction leaf springs 116 and 117, respectively. A left leaf portion of the first U-shaped leaf spring 110 is embedded in the movable support side-member 32, and an upper leaf portion of the second U-shaped leaf spring 115 is embedded in the connecting member 36. L-shaped bent ends 110a formed at opposite ends of the first U-shaped leaf spring 110 are embedded in the stationary support side-member 29, and L-shaped bent ends 115a formed at opposite ends of the second U-shaped leaf spring 115 are embedded in the support member 33. In the second modification of the stage apparatus 100 shown in FIG. 24, the stationary support side-member 29, the first U-shaped leaf spring 110 and the movable support side-member 32 constitute the Y-direction deformable body YU, and the support member 33, the second U-shaped leaf spring 115 and the connecting member 36 constitute the X-direction deformable body XU.

Likewise with the stage apparatus 100 incorporated in the second embodiment of the camera shake correction apparatus shown in FIGS. 14 through 19, the stage apparatus 100 shown in FIG. 24 can be formed as one body by insertion molding, wherein the first U-shaped leaf spring 110 and the second U-shaped leaf spring 115 are set in a molding die (not shown) in advance. The movable support side-member 32 substantially linearly moves in the Y-direction relative to the stationary support side-member 29 to correct camera shake in the Y-direction by resilient deformation of each of the pair of X-direction leaf springs 111 and 112 in the shape of a letter S as viewed in the Z-direction, while the connecting member 36 substantially linearly moves in the X-direction relative to the support member 33 to correct camera shake in the X-direction by resilient deformation of each of the pair of Y-direction leaf springs 116 and 117 in the shape of a letter S as viewed in the Z-direction. Note that a reinforcing element which corresponds to each reinforcing element 105 shown in FIG. 20 can be integrally formed on both sides of each X-direction leaf spring 111 and 112 except both end portions thereof by insertion molding, and that a reinforcing element which corresponds to each reinforcing element 106 shown in FIG. 20 can be integrally formed on both sides of each Y-direction leaf spring 116 and 117 except both end portions thereof by insertion molding.

A third embodiment of the camera shake correction apparatus (image stabilizer) according to the present invention will be hereinafter discussed with reference to FIGS. 25 through 29. Elements and portions of this embodiment of the camera shake correction apparatus which are similar to those of the second embodiment of the camera shake correction apparatus shown in FIGS. 14 through 19 are designated by the same reference numerals, and detailed descriptions of such similar elements and portions are omitted from the following descriptions.

The third embodiment of the camera shake correction apparatus is the same as the second embodiment of the camera shake correction apparatus except that a stage apparatus 300 in the third embodiment of the camera shake correction apparatus is different in structure from the stage apparatus 100 in the second embodiment of the camera shake correction apparatus, and accordingly, only the stage apparatus 300 will be discussed thereinafter.

Figure 25:
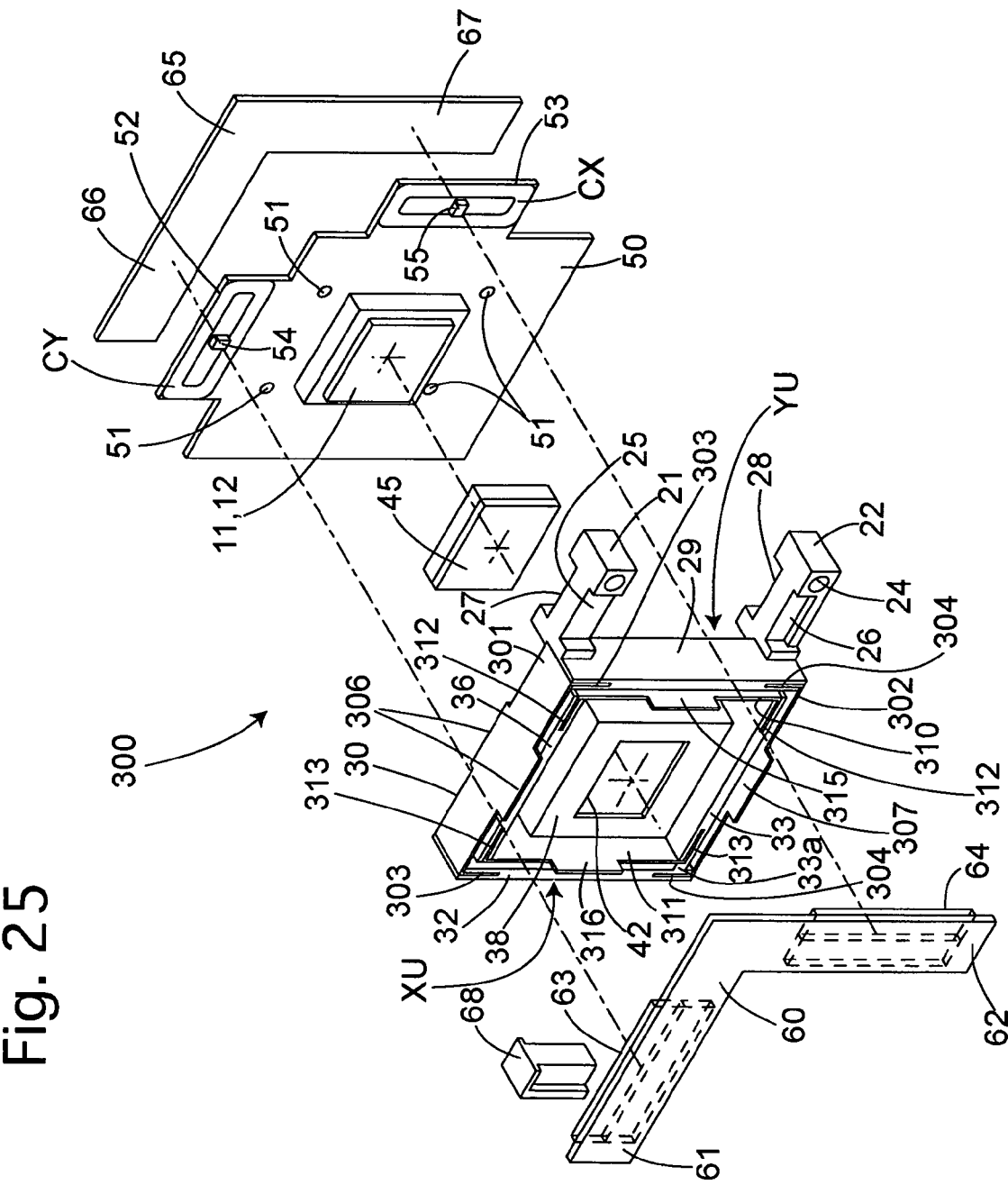
FIG. 25 is an exploded perspective view of a third embodiment of the camera shake correction apparatus.
Figure 26:
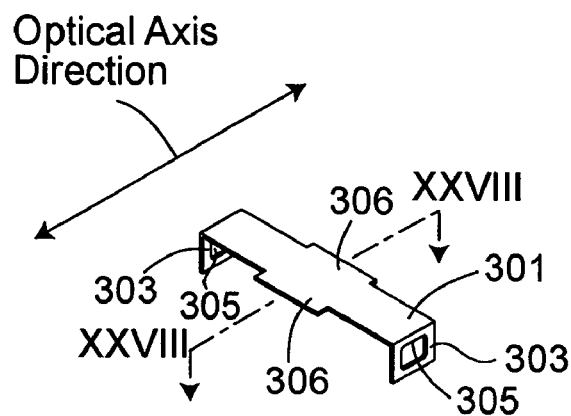
FIG. 26 is a perspective view of an X-direction leaf spring shown in FIG. 25.

The stage apparatus 300 shown in FIG. 25 is provided with a pair of X-direction leaf springs 301 and 302 (which correspond to the pair of X-direction leaf springs 101 and 102 in the stage apparatus 100) which have the same shape and size and are symmetrically arranged with respect to a horizontal line between the pair of X-direction leaf springs 301 and 302. The pair of X-direction leaf springs 301 and 302 are made of metal such as stainless steel, nickel silver or hard aluminum. Opposite end portions of the upper X-direction leaf spring 301 are bent at an angle of approximately 90 degrees to be formed as two fixing end portions 303, respectively, and opposite end portions of the lower X-direction leaf spring 302 are bent at an angle of approximately 90 degrees to be formed as two fixing end portions 304, respectively. Each of the two fixing end portions 303 of the upper X-direction leaf spring 301 is provided with a through hole 305 (see FIG. 26) used for insertion molding, and each of the two fixing portions 304 of the lower X-direction leaf spring 302 is provided with a through hole (not shown) used for insertion molding. The upper X-direction leaf spring 301 is provided, on a middle portion thereof in the lengthwise direction of the upper X-direction leaf spring 301, with a pair of reinforcing projections (front and rear reinforcing projections/X-direction reinforcing portions/X-direction reinforcing projections) 306 which are formed integral with the upper X-direction leaf spring 301, and the lower X-direction leaf spring 302 is provided, on a middle portion thereof in the lengthwise direction of the lower X-direction leaf spring 302, with a pair of reinforcing projections (front and rear reinforcing projections/X-direction reinforcing portions/X-direction reinforcing projections) 307 which are formed integral with the lower X-direction leaf spring 302. Each of the pair of X-direction leaf springs 301 and 302 can be made as one body by press forming.

Figure 27:
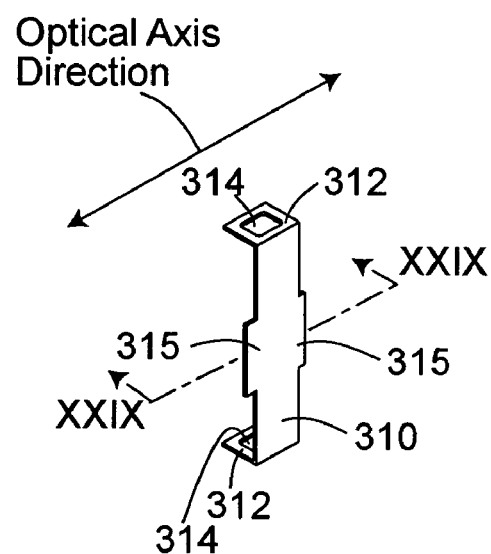
FIG. 27 is a perspective view of a Y-direction leaf spring shown in FIG. 25.
Figure 28:
FIG. 28 is a cross sectional view taken along XXVIII-XXVIII line shown in FIG. 26.
Figure 29:
FIG. 29 is a cross sectional view taken along XXIX-XXIX line shown in FIG. 27.

As shown in FIGS. 27 and 29, the stage apparatus 300 shown in FIG. 25 is provided with a pair of Y-direction leaf springs 310 and 311 (which correspond to the pair of Y-direction leaf springs 103 and 104 in the stage apparatus 100) which have the same shape and size and are symmetrically arranged with respect to a vertical line between the pair of Y-direction leaf springs 310 and 311. The pair of Y-direction leaf springs 310 and 311 are made of metal such as stainless steel, nickel silver or hard aluminum. Opposite end portions of the right Y-direction leaf spring 310 are bent at an angle of approximately 90 degrees to be formed as two fixing end portions 312, respectively, and opposite end portions of the left Y-direction leaf spring 311 are bent at an angle of approximately 90 degrees to be formed as two fixing end portions 313, respectively. Each of the two fixing end portions 312 of the right Y-direction leaf spring 310 is provided with a through hole 314 (see FIG. 27) used for insertion molding, and each of the two fixing portions 313 of the left Y-direction leaf spring 311 is provided with a through hole (not shown) used for insertion molding. The right Y-direction leaf spring 310 is provided, on a middle portion thereof in the lengthwise direction of the right Y-direction leaf spring 310, with a pair of reinforcing projections (front and rear reinforcing projections/Y-direction reinforcing portions/Y-direction reinforcing projections) 315 which are formed integral with the right Y-direction leaf spring 310, and the left Y-direction leaf spring 311 is provided, on a middle portion thereof in the lengthwise direction of the left Y-direction leaf spring 311, with a pair of reinforcing projections (front and rear reinforcing projections/Y-direction reinforcing portions/Y-direction reinforcing projections) 316 which are formed integral with the left Y-direction leaf spring 311. Each of the pair of Y-direction leaf springs 310 and 311 can be made as one body by press forming.

Likewise with the stage apparatus 100 incorporated in the second embodiment of the camera shake correction apparatus shown in FIGS. 14 through 19, the stage apparatus 300 that has the above described structure can be formed by pouring melted synthetic resin into a molding die (not shown) in which the four leaf springs 301, 302, 310 and 311 are set in advance, i.e., can be formed as one body by insertion molding. If the stage apparatus 300 is formed by insertion molding, the two fixing end portions 303 of the upper X-direction leaf spring 301 are embedded in the upper ends of the stationary support side-member 29 and the movable support side-member 32, respectively, the two fixing end portions 304 of the lower X-direction leaf spring 302 are embedded in the lower ends of the stationary support side-member 29 and the movable support side-member 32, respectively, the two fixing end portions 312 of the right Y-direction leaf spring 310 are embedded in the right ends of the support member 33 and the connecting member 36, respectively, and the two fixing end portions 313 of the left Y-direction leaf spring 311 are embedded in the left ends of the support member 33 and the connecting member 36, respectively.

In the stage apparatus 300 shown in FIG. 25, the stationary support side-member 29, the pair of X-direction leaf springs 301 and 302, and the movable support side-member 32 constitute the Y-direction deformable body YU, and the support member 33, the pair of Y-direction leaf springs 310 and 311 and the connecting member 36 constitute the X-direction deformable body XU.

In the stage apparatus 300 shown in FIG. 25, the pair of reinforcing projections (306 or 307), which increases the flexural rigidity EI (E: modulus of longitudinal elasticity; I: geometrical moment of inertia with respect to a neutral axis of a cross section) and the torsion rigidity GIp (G: modulus of transverse elasticity; Ip: polar moment of inertia of area with respect to a center of the cross section), are integrally formed by press forming on a middle portion of each X-direction leaf spring 301 and 302 except both end portions thereof (i.e., which increases the aforementioned geometrical moment of inertia I and the aforementioned polar moment of inertia of area Ip of the middle portion of each X-direction leaf spring 301 and 302 to be greater than those of the both end portions of each X-direction leaf spring 301 and 302), hence, each X-direction leaf spring 301 and 302 can be prevented from being bent or twisted at the middle portion thereof even if a large force in a direction parallel to the optical axis O is exerted on the movable support side-member 32, similar to the above described stage apparatus 100 shown in FIGS. 20 and 21. Therefore, it is possible to prevent an inclination of the imaging surface 12 of the image pickup device 11 with respect to the optical axis O caused by a twisting or a bending of each X-direction leaf spring 301 and 302 from occurring.

Likewise, the pair of reinforcing projections (315 or 316), which increases the flexural rigidity EI and the torsion rigidity GIp, are integrally formed on a middle portion of each Y-direction leaf spring 310 and 311 except both end portions thereof (i.e., which increases the aforementioned geometrical moment of inertia I and the aforementioned polar moment of inertia of area Ip of the middle portion of each Y-direction leaf spring 310 and 311 to be greater than those of the both end portions of each Y-direction leaf spring 310 and 311), hence, each Y-direction leaf spring 310 and 311 can be prevented from being bent or twisted at the middle portion thereof even if a great force in a direction parallel to the optical axis O is exerted on the connecting member 36, similar to the above described stage apparatus 100 shown in FIGS. 20 and 21. Therefore, it is possible to prevent an inclination of the imaging surface 12 of the image pickup device 11 with respect to the optical axis O which is to be caused by a twisting or a bending of each Y-direction leaf spring 310 and 311 from occurring.

Moreover, the stage apparatus 300 shown in FIG. 25 can be easily made at a low cost of production because the pair of reinforcing projections 306, the pair of reinforcing projections 307, the pair of reinforcing projections 315 and the pair of reinforcing projections 316 can be integrally formed on the four leaf springs 301, 302, 310 and 311 by press forming, respectively. Furthermore, the increment of weight of each of the four leaf springs 301, 302, 310 and 311 is small, and accordingly, the controllability thereof does not deteriorate even though the spring constant of each leaf spring 301, 302, 310 and 311 increases because the pair of reinforcing projections 306, the pair of reinforcing projections 307, the pair of reinforcing projections 315 and the pair of reinforcing projections 316 are small in size and are formed only on middle portions of the four leaf springs 301, 302, 310 and 311, respectively.

A modification of the stage apparatus incorporated in the third embodiment of the camera shake correction apparatus will be hereinafter discussed with reference to FIGS. 30 through 34.

Figure 30:
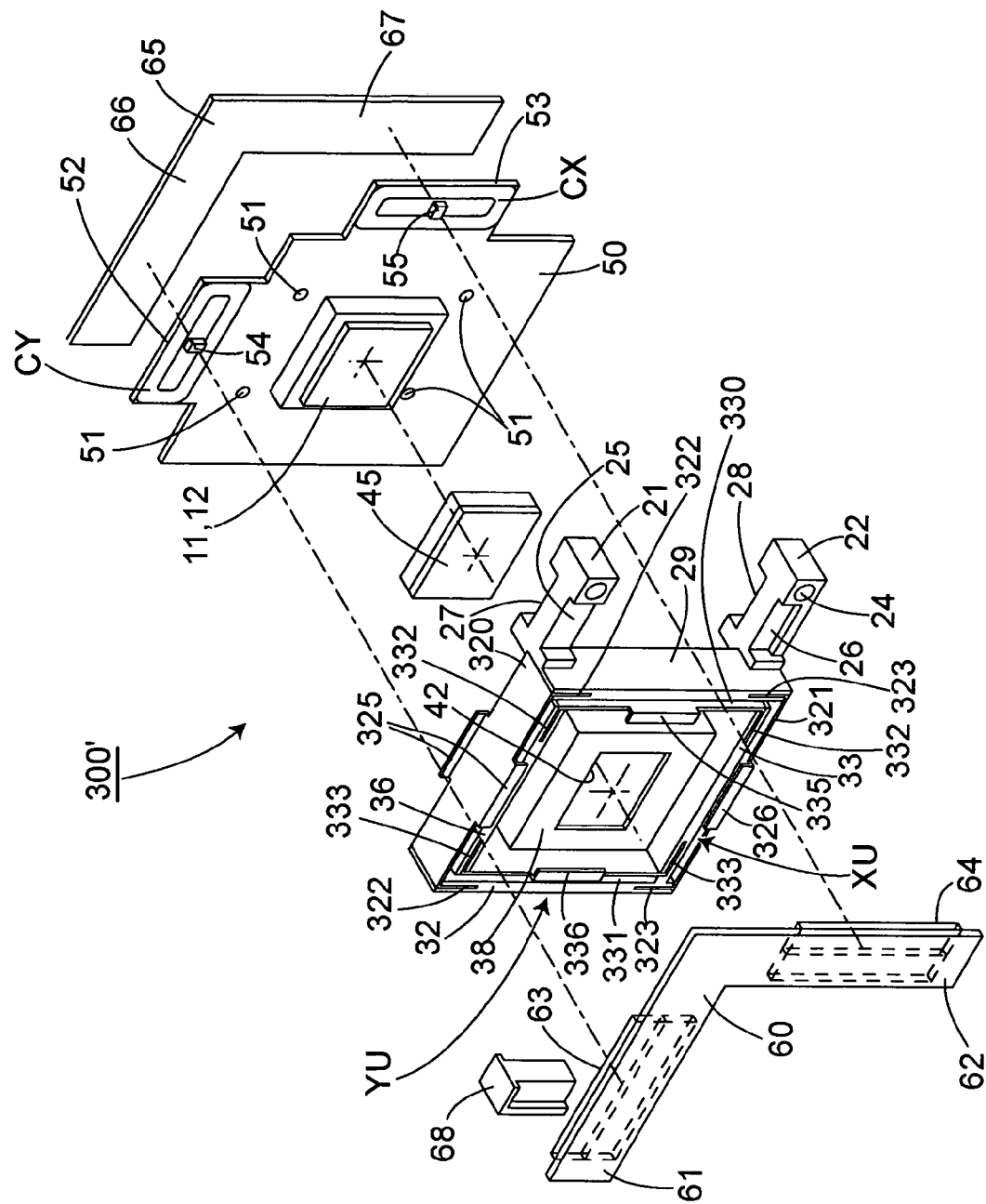
FIG. 30 is an exploded perspective view of a modification of the third embodiment of the camera shake correction apparatus.
Figure 31:
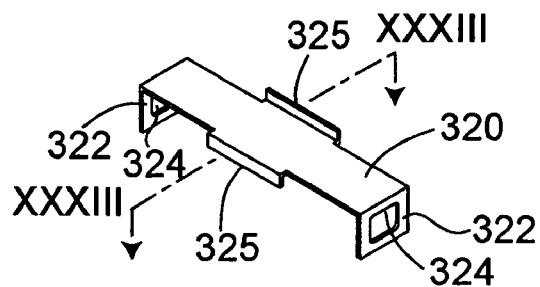
FIG. 31 is a perspective view of an X-direction leaf spring shown in FIG. 30.
Figure 33:
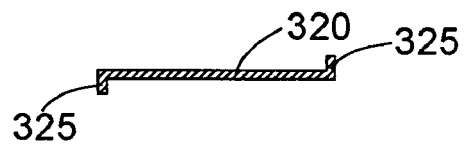
FIG. 33 is a cross sectional view taken along XXXIII-XXXIII line shown in FIG. 31.

The stage apparatus 300' shown in FIG. 30 is provided with a pair of X-direction leaf springs 320 and 321 (which correspond to the pair of X-direction leaf springs 301 and 302 in the stage apparatus 300) which have the same shape and size and are symmetrically arranged with respect to a horizontal line between the pair of X-direction leaf springs 320 and 321. The pair of X-direction leaf springs 320 and 321 are made of metal such as stainless steel, nickel silver or hard aluminum. Opposite end portions of the upper X-direction leaf spring 320 are bent at an angle of approximately 90 degrees to be formed as two fixing end portions 322, respectively, and opposite end portions of the lower X-direction leaf spring 321 are bent at an angle of approximately 90 degrees to be formed as two fixing end portions 323, respectively. Each of the two fixing end portions 322 of the upper X-direction leaf spring 320 is provided with a through hole 324 (see FIG. 31) used for insertion molding, and each of the two fixing portions 323 of the lower X-direction leaf spring 321 is provided with a through hole (not shown) used for insertion molding. The upper X-direction leaf spring 320 is provided, on a middle portion thereof in the lengthwise direction of the upper X-direction leaf spring 320, with a pair of reinforcing projections (front and rear reinforcing projections/X-direction reinforcing portions/X-direction reinforcing projections) 325 which are formed integral with the upper X-direction leaf spring 320, and the lower X-direction leaf spring 321 is provided, on a middle portion thereof in the lengthwise direction of the lower X-direction leaf spring 321, with a pair of reinforcing projections (front and rear reinforcing projections/X-direction reinforcing portions/X-direction reinforcing projections) 326 which are formed integral with the lower X-direction leaf spring 321. The pair of reinforcing projections 325 are integrally formed on the upper X-direction leaf spring 320 by press forming, and the pair of reinforcing projections 326 are integrally formed on the lower X-direction leaf spring 321 by press forming. As shown in FIGS. 31 and 33, each reinforcing projection 325 (and 326) has an L-shaped cross section, the pair of reinforcing projections 325 are bent at an angle of substantially 90 degrees in opposite directions (upward and downward), and the pair of reinforcing projections 326 are bent at an angle of substantially 90 degrees in opposite directions (upward and downward). The reason why each pair of reinforcing projections 325 and 326 are bent in opposite directions is to prevent each pair of reinforcing projections 325 and 326 from interfering with peripheral elements (not shown) installed in the digital camera 10.

Figure 32:
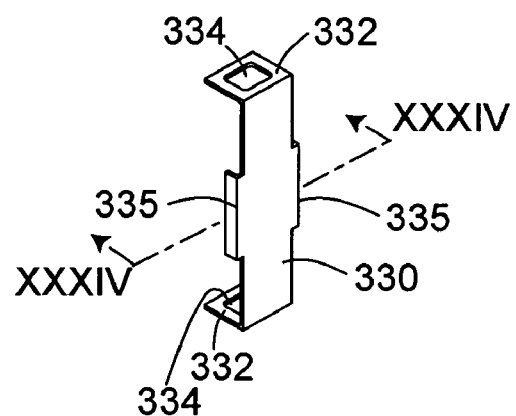
FIG. 32 is a perspective view of a Y-direction leaf spring shown in FIG. 30.
Figure 34:
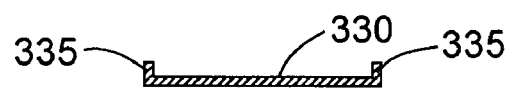
FIG. 34 is a cross sectional view taken along XXXIV-XXXIV line shown in FIG. 32.

Additionally, the stage apparatus 300' shown in FIG. 30 is provided with a pair of Y-direction leaf springs 330 and 331 (which correspond to the pair of X-direction leaf springs 310 and 311 in the stage apparatus 300) which have the same shape and size and which are symmetrically arranged with respect to a vertical line between the pair of Y-direction leaf springs 330 and 331. The pair of Y-direction leaf springs 330 and 331 are made of metal such as stainless steel, nickel silver or hard aluminum. Opposite end portions of the right Y-direction leaf spring 330 are bent at an angle of approximately 90 degrees to be formed as two fixing end portions 332, respectively, and opposite end portions of the left Y-direction leaf spring 331 are bent at an angle of approximately 90 degrees to be formed as two fixing end portions 333, respectively. Each of the two fixing end portions 332 of the right Y-direction leaf spring 330 is provided with a through hole 334 (see FIG. 32) used for insertion molding, and each of the two fixing portions 333 of the left Y-direction leaf spring 331 is provided with a through hole (not shown) used for insertion molding. The right Y-direction leaf spring 330 is provided, on a middle portion thereof in the lengthwise direction of the right Y-direction leaf spring 330, with a pair of reinforcing projections (front and rear reinforcing projections/X-direction reinforcing portions/Y-direction reinforcing projections) 335 which are formed integral with the right Y-direction leaf spring 330, and the left Y-direction leaf spring 331 is provided, on a middle portion thereof in the lengthwise direction of the left Y-direction leaf spring 331, with a pair of reinforcing projections (front and rear reinforcing projections/Y-direction reinforcing portions/Y-direction reinforcing projections) 336 which are formed integral with the left Y-direction leaf spring 331. The pair of reinforcing projections 335 are integrally formed on the right Y-direction leaf spring 330 by press forming, and the pair of reinforcing projections 336 are integrally formed on the left Y-direction leaf spring 331 by press forming. As shown in FIGS. 32 and 34, each reinforcing projection 335 (and 336) has an L-shaped cross section, the pair of reinforcing projections 335 are bent at an angle of substantially 90 degrees in the same direction (leftward), and the pair of reinforcing projections 336 are bent at an angle of substantially 90 degrees in the same direction (rightward).

Similar to the stage apparatus 300 shown in FIG. 25, the stage apparatus 300' that has the above described structure can be formed by pouring melted synthetic resin into a molding die (not shown) in which the four leaf springs 320, 321, 330 and 331 are set in advance, i.e., can be formed as one body by insertion molding. If the stage apparatus 300' is formed by insertion molding, the two fixing end portions 322 of the upper X-direction leaf spring 320 are embedded in the upper ends of the stationary support side-member 29 and the movable support side-member 32, respectively, the two fixing end portions 323 of the lower X-direction leaf spring 321 are embedded in the lower ends of the stationary support side-member 29 and the movable support side-member 32, respectively, the two fixing end portions 332 of the right Y-direction leaf spring 330 are embedded in the right ends of the support member 33 and the connecting member 36, respectively, and the two fixing end portions 333 of the left Y-direction leaf spring 331 are embedded in the left ends of the support member 33 and the connecting member 36, respectively.

In the stage apparatus 300' shown in FIG. 30, the stationary support side-member 29, the pair of X-direction leaf springs 320 and 321 and the movable support side-member 32 constitute the Y-direction deformable body YU, and the support member 33, the pair of Y-direction leaf springs 330 and 331 and the connecting member 36 constitute the X-direction deformable body XU.

In the stage apparatus 300' shown in FIG. 30, the pair of reinforcing projections (325 or 326), which increases the flexural rigidity EI (E: modulus of longitudinal elasticity; I: geometrical moment of inertia with respect to a neutral axis of a cross section) and the torsion rigidity GIp (G: modulus of transverse elasticity; Ip: polar moment of inertia of area with respect to a center of the cross section), are integrally formed on a middle portion of each X-direction leaf spring 320 and 321 except both end portions thereof (i.e. which increases the aforementioned geometrical moment of inertia I and the aforementioned polar moment of inertia of area Ip of the middle portion of each X-direction leaf spring 320 and 321 to be greater than those of the both end portions of each X-direction leaf spring 320 and 321), each X-direction leaf spring 320 and 321 can be prevented from being bent or twisted at the middle portion thereof even if a large force in a direction parallel to the optical axis O is exerted on the movable support side-member 32, similar to the above described stage apparatus 100 shown in FIGS. 20 and 21 and the above described stage apparatus 300 shown in FIG. 25. Therefore, it is possible to prevent an inclination of the imaging surface 12 of the image pickup device 11 with respect to the optical axis O which is to be caused by a twisting or a bending of each X-direction leaf spring 320 and 321 from occurring.

Likewise, the pair of reinforcing projections (335 or 336), which increases the flexural rigidity EI and the torsion rigidity GIp, are integrally formed on a middle portion of each Y-direction leaf spring 330 and 331 except both end portions thereof (i.e., which increases the aforementioned geometrical moment of inertia I and the aforementioned polar moment of inertia of area Ip of the middle portion of each Y-direction leaf spring 330 and 331 to be greater than those of the both end portions of each Y-direction leaf spring 330 and 331) hence, each Y-direction leaf spring 330 and 331 can be prevented from being bent or twisted at the middle portion thereof even if a large force in a direction parallel to the optical axis O is exerted on the connecting member 36, similar to the above described stage apparatus 100 shown in FIGS. 20 and 21 and the above described stage apparatus 300 shown in FIG. 25. Therefore, it is possible to prevent an inclination of the imaging surface 12 of the image pickup device 11 with respect to the optical axis O caused by a twisting or a bending of each Y-direction leaf spring 330 and 331 from occurring.

Moreover, the flexural rigidity EI and the torsion rigidity GIp of a middle portion of each of the four leaf springs 320, 321, 330 and 331 of the stage apparatus 300' shown in FIG.

30 are higher than those of a middle portion of each of the four leaf springs 301, 302, 310 and 311 of the stage apparatus 300 shown in FIG. 25 because each reinforcing projection 325, 356, 335 and 336 has an L-shaped cross section. Furthermore, the stage apparatus 300' shown in FIG. 30 can be easily made at a low cost of production because the pair of reinforcing projections 325, the pair of reinforcing projections 326, the pair of reinforcing projections 335, and the pair of reinforcing projections 336 can be integrally formed on the four leaf springs 320, 321, 330 and 331 by press forming, respectively. Furthermore, the increment of weight of each of the four leaf springs 320, 321, 330 and 331 is small, and accordingly, the controllability thereof does not deteriorate even though the spring constant of each leaf spring 320, 321, 330 and 331 increases because the pair of reinforcing projections 325, the pair of reinforcing projections 326, the pair of reinforcing projections 335, and the pair of reinforcing projections 336 are small in size and are formed only on middle portions of the four leaf springs 320, 321, 330 and 331, respectively.

The following two pairs of leaf springs: the pair of X-direction leaf springs 301 and 302 and the pair of Y-direction leaf springs 310 and 311 in the stage apparatus 300 shown in FIG. 25 can be replaced by a pair of U-shaped leaf springs which correspond to the first U-shaped leaf spring 110 and the second U-shaped leaf spring 115, respectively, and the pair of reinforcing projections 306 and 307 and the pair of reinforcing projections 315 and 316 can be formed integral with such a pair of U-shaped leaf springs, respectively. Likewise, the following two pairs of leaf springs: the pair of X-direction leaf springs 320 and 321 and the pair of Y-direction leaf springs 330 and 331 in the stage apparatus 300' shown in FIG. 30 can be replaced by a pair of U-shaped leaf springs which correspond to the first U-shaped leaf spring 110 and the second U-shaped leaf spring 115, respectively, and the pair of reinforcing projections 325 and 326 and the pair of reinforcing projections 335 and 336 can be formed integral with such a pair of U-shaped leaf springs, respectively.

Instead of providing the above described eight leaf springs 301, 302, 310, 311, 320, 321, 330 and 331 with the above described eight pairs of reinforcing projections 306, 307, 315, 316, 325, 326, 335 and 336, respectively, it is possible for each leaf spring (301, 302, 310, 311, 320, 321, 330 and 331) to be provided thereon at a middle portion of the leaf spring with a reinforcing protuberance (not shown) which bulges in a direction of the thickness of the leaf spring to make the middle portion of the leaf spring greater in thickness than the remaining portion (both ends) of the leaf spring (i.e., which makes the flexural rigidity EI and the torsion rigidity GIp of the middle portion of the leaf spring greater than those of the remaining portion of the leaf spring), wherein the reinforcing protuberance provided on each of the pair of X-direction leaf springs 301 and 302 and each of the pair of X-direction leaf springs 320 and 321 serves as an X-direction reinforcing protuberance, and wherein the reinforcing protuberance provided on each of the pair of Y-direction leaf springs 310 and 311 and each of the pair of Y-direction leaf springs 330 and 331 serves as a Y-direction reinforcing protuberance. These modifications can also increase the strength of the middle portion of each leaf spring (301, 302, 310, 311, 320, 321, 330 and 331) against bending and twisting.

Although the present invention has been discussed above with reference to the specific embodiments and modifications thereof described above, the present invention is not limited solely thereto; various changes can be made in these specific embodiments and modifications thereof.

Figure 35:
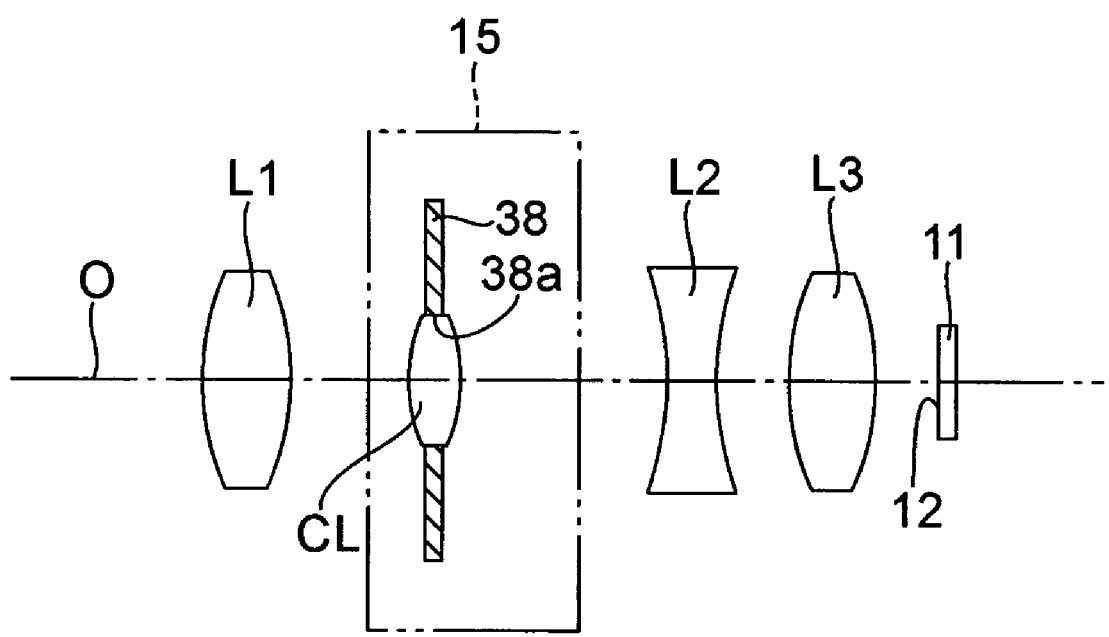
FIG. 35 is an axial cross sectional view of a portion of a modified embodiment of the camera shake correction apparatus according to the present invention, wherein a correction lens is provided.

Although the image pickup device 11 is secured to the support enclosure 38 which is moved in the X and Y directions to compensate camera shake in each of the above illustrated embodiments of the camera shake correction apparatuses, it is possible to arrange the image pickup device 11, for example as shown in FIG. 35, behind the camera shake correction apparatus 15 and to form a circular mounting hole 38a in the support enclosure 38. A correction lens CL can be fitted and secured to the mounting hole 38a so that the optical axis of the correction lens CL coincides with the optical axis O of the photographing optical system, and can be arranged between the lenses L1 and L2 as shown in FIG. 35 (or alternatively between the lenses L2 and L3). In this alternative, the correction lens CL is linearly moved in the X and Y directions to compensate camera shake. Furthermore, the camera shake correction apparatus 15 using the correction lens CL can be applied to a silver-halide film camera which does not use an image pickup device such as the image pickup device 11.

Although the X-direction Hall element 54 and the Y-direction Hall element 55 are used as position sensors in each of the above described first, second and third embodiments of the camera shake correction apparatuses, each of the X-direction Hall element 54 and the Y-direction Hall element 55 can be replaced by an MR (magnetic resonance) sensor or an optical position sensor.

Additionally, although the stationary support side-member 29 and the movable support side-member 32 are respectively connected to both ends of each of the following X-direction leaf springs: the pair of X-direction leaf springs 30 and 31, the pair of X-direction leaf springs 70 and 71, the pair of X-direction leaf springs 80 and 81, the pair of X-direction leaf springs 101 and 102, the pair of X-direction leaf springs 111 and 112, the pair of X-direction leaf springs 301 and 302, and the pair of X-direction leaf springs 320 and 321, it is possible for the stationary support side-member 29 and the movable support side-member 32 to be respectively connected to portions of each of these X-direction leaf springs in the vicinity of both ends thereof. Likewise, although the support member 33 and the connecting member 36 are respectively connected to both ends of each of the following Y-direction leaf springs: the pair of Y-direction leaf springs 34 and 35, the pair of Y-direction leaf springs 74 and 75, the pair of Y-direction leaf springs 84 and 85, the pair of Y-direction leaf springs 103 and 104, the pair of Y-direction leaf springs 116 and 117, the pair of Y-direction leaf springs 310 and 311, and the pair of Y-direction leaf springs 330 and 331, it is possible for the support member 33 and the connecting member 36 to be respectively connected to portions of each of these Y-direction leaf springs in the vicinity of both ends thereof.

Although both the pair of X-direction leaf springs and the pair of Y-direction leaf springs are made of metal in each of the second and third embodiments of the camera shake correction apparatuses and the modification thereof, the pair of X-direction leaf springs can be made of metal and the pair of Y-direction leaf springs can be made of synthetic resin (which is the same type as the aforementioned synthetic resin used for insertion molding), or vice versa. Moreover, each of the stationary support side-member 29, the movable support side-member 32, the support member 33 and the connecting member 36 can be partly made from metal.

Although the stage apparatus according to the present invention is applied to the camera shake correction apparatus 15 in the above description, the stage apparatus according to the present invention is not limited solely to such a particular use, and can be used for various types of apparatuses which are movable two-dimensionally in the X and Y directions.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A stage apparatus comprising:
    a Y-direction deformable body including a stationary support member, a movable support member and a pair of X-direction leaf springs to form a substantially rectangular shape in a free state; and
    an X-direction deformable body, positioned in said Y-direction deformable body, including a connecting member, a support member and a pair of Y-direction leaf springs to form a substantially rectangular shape in a free state;
    wherein said stationary support member and said movable support member of the Y-direction deformable body and a pair of said Y-direction leaf springs of the X-direction deformable body extend in a specific Y-direction, said stationary support member being fixed to a stationary body;
    wherein a pair of said X-direction leaf springs of the Y-direction deformable body and said connecting member and said support member of the X-direction deformable body extend in an X-direction perpendicular to said Y-direction;
    wherein said support member of said X-direction deformable body includes a support member joint portion which joins said support member to said movable support member of said Y-direction deformable body, and
    wherein said X-direction deformable body and said Y-direction deformable body are integrally molded by synthetic resin together with said support member joint portion.

2. The stage apparatus according to claim 1, wherein a thickness of each said pair of X-direction leaf springs of said Y-direction deformable body in said Y-direction is smaller than a thickness of each said stationary support member and said movable support member of said Y-direction deformable body in the X-direction.

3. The stage apparatus according to claim 1, wherein a thickness of each said pair of Y-direction leaf springs of said X-direction deformable body in said X-direction is smaller than a thickness of each said support member and said connecting member of said X-direction deformable body in the Y-direction.

4. The stage apparatus according to claim 1, wherein each said pair of X-direction leaf springs comprise two grooves at opposite ends thereof, respectively, which extend in a Z-direction orthogonal to both said X-direction and said Y-direction.

5. The stage apparatus according to claim 1, wherein each said pair of Y-direction leaf springs comprise two grooves at opposite ends thereof, respectively, which extend in a Z-direction orthogonal to both said X-direction and said Y-direction.

6. The stage apparatus according to claim 1, wherein opposite ends of each said pair of X-direction leaf springs are smaller in thickness than a middle portion thereof in said Y-direction.

7. The stage apparatus according to claim 1, wherein opposite ends of each said pair of Y-direction leaf springs are smaller in thickness than a middle portion thereof in said X-direction.

8. The stage apparatus according to claim 1, wherein said X-direction deformable body and said Y-direction deformable body are molded as one body by injection molding.

9. The stage apparatus according to claim 1, wherein said stage apparatus includes a shake correction apparatus comprising:
    a coil substrate fixed to said connecting member;
    at least one position sensor, mounted to said coil substrate, for detecting a position of said coil substrate in said X-direction and said Y-direction; and
    an X-direction planar drive coil and a Y-direction planar drive coil which are mounted to said coil substrate to be respectively positioned in magnetic fields of two stationary magnets fixed to said stationary body.

10. The stage apparatus according to claim 1, wherein at least one projection which projects from said stationary support member is fixed to said stationary body.

11. The stage apparatus according to claim 1, wherein said stage apparatus is incorporated in a camera.

12. The stage apparatus according to claim 9, wherein said coil substrate lies in a plane perpendicular to a Z-direction orthogonal to both said X-direction and said Y-direction.

13. The stage apparatus according to claim 9, wherein an image pickup device is mounted to said coil substrate.

14. A camera shake correction apparatus using said stage apparatus according to claim 9, said camera shake correction apparatus comprising:
    a camera which incorporates said stage apparatus;
    an image pickup device positioned behind a photographing optical system of said camera, having an imaging surface located on an image plane of said photographing optical system, and being movable together with said connecting member of said X-direction deformable body;
    a camera shake detection sensor which detects camera shake of said camera; and
    a controller which applies a voltage to said X-direction planar drive coil and said Y-direction planar drive coil in accordance with said camera shake detected by said camera shake detection sensor to stabilize an object image which is formed on said imaging surface of said image pickup device through said photographing optical system.

15. The camera shake correction apparatus according to claim 14, wherein said controller applies said voltage to said X-direction planar drive coil and said Y-direction planar drive coil to reduce a difference between the amount of said camera shake detected by said camera shake detection sensor and the amount of movement of said connecting member which is detected by said position sensor.

16. A camera shake correction apparatus using said stage apparatus according to claim 9, said camera shake correction apparatus comprising:
    a camera which incorporates said stage apparatus;
    a correction lens located in front of an image plane of a photographing optical system of said camera, positioned so that an optical axis of said correction lens coincides with an optical axis of said photographing optical system, said correction lens being movable together with said connecting member of said X-direction deformable body; p1 a camera shake detection sensor which detects camera shake of said camera; and a controller which applies a voltage to said X-direction planar drive coil and said Y-direction planar drive coil in accordance with said camera shake detected by said camera shake detection sensor to stabilize an object image which is formed on said imaging surface of said image pickup device through said photographing optical system.

17. The camera shake correction apparatus according to claim 16, wherein said controller applies said voltage to said X-direction planar drive coil and said Y-direction planar drive coil to reduce a difference between the amount of said camera shake detected by said camera shake detection sensor and the amount of movement of said connecting member which is detected by said position sensor.

18. A stage apparatus comprising:
  a Y-direction deformable body including a stationary support member, a movable support member and a pair of X-direction leaf springs to form a substantially rectangular shape in a free state; and
  an X-direction deformable body, positioned in said Y-direction deformable body, including a connecting member, a support member and a pair of Y-direction leaf springs to form a substantially rectangular shape in a free state;
  wherein said stationary support member and said movable support member of the Y-direction deformable body and a pair of said Y-direction leaf springs of the X-direction deformable body extend in a specific Y-direction, said stationary support member being fixed to a stationary body;
  wherein a pair of said X-direction leaf springs of the Y-direction deformable body and said connecting member and said support member of the X-direction deformable body extend in an X-direction perpendicular to said Y-direction;
  wherein at least one pair of said pair of X-direction leaf springs and said pair of Y-direction leaf springs are made of metal;
  wherein said support member of said X-direction deformable body includes a support member joint portion which joins said support member to said movable support member of said Y-direction deformable body, and
  wherein said X-direction deformable body and said Y-direction deformable body, except said at least one pair of said pair of X-direction leaf springs and said pair of Y-direction leaf springs which are made of metal, are integrally molded by synthetic resin together with said support member joint portion.

19. The stage apparatus according to claim 18, further comprising an X-direction reinforcing element which is fixed to a middle portion of each said pair of X-direction leaf springs in a lengthwise direction thereof so that a flexural rigidity and a torsional rigidity of said middle portion of each said pair of X-direction leaf springs are greater than those of a remaining portion of each said pair of X-direction leaf springs.

20. The stage apparatus according to claim 19, wherein said X-direction reinforcing element is made of synthetic resin.

21. The stage apparatus according to claim 19, wherein said pair of X-direction leaf springs are made of metal, and
  wherein said X-direction reinforcing element includes a pair of X-direction reinforcing projections which are integrally formed on each said pair of X-direction leaf springs by press forming to project from opposite ends thereof in a Z-direction orthogonal to both said X-direction and said Y-direction.

22. The stage apparatus according to claim 18, further comprising a Y-direction reinforcing element which is fixed to a middle portion of each said pair of Y-direction leaf springs in a lengthwise direction thereof so that a flexural rigidity and a torsional rigidity of said middle portion of each said pair of Y-direction leaf springs are greater than those of a remaining portion of each said pair of Y-direction leaf springs.

23. The stage apparatus according to claim 22, wherein said Y-direction reinforcing element is made of synthetic resin.

24. The stage apparatus according to claim 22, wherein said pair of Y-direction leaf springs are made of metal, and
  wherein said Y-direction reinforcing element comprises a pair of Y-direction reinforcing projections which are integrally formed on each said pair of Y-direction leaf springs by press forming to project from opposite ends thereof in a Z-direction orthogonal to both said X-direction and said Y-direction.

25. The stage apparatus according to claim 21, wherein each said pair of X-direction reinforcing projections is L-shaped in cross section.

26. The stage apparatus according to claim 24, wherein each said pair of Y-direction reinforcing projections is L-shaped in cross section.

27. The stage apparatus according to claim 1, wherein said pair of X-direction leaf springs are made of metal and formed as two leaf spring portions of a U-shaped spring.

28. The stage apparatus according to claim 1, wherein said pair of Y-direction leaf springs are made of metal and formed as two leaf spring portions of a U-shaped spring.

29. The stage apparatus according to claim 14, said the stage apparatus comprising:
  a coil substrate fixed to said connecting member;
  at least one position sensor, mounted to said coil substrate, for detecting a position of said coil substrate in said X-direction and said Y-direction; and
  an X-direction planar drive coil and a Y-direction planar drive coil which are mounted to said coil substrate to be respectively positioned in magnetic fields of two stationary magnets fixed to said stationary body.

30. A camera shake correction apparatus using said stage apparatus according to claim 29, said camera shake correction apparatus comprising:
  a camera which incorporates said stage apparatus;
  an image pickup device positioned behind a photographing optical system of said camera, having an imaging surface located on an image plane of said photographing optical system, and being movable together with said connecting member of said X-direction deformable body;
  a camera shake detection sensor which detects camera shake of said camera; and
  a controller which applies a voltage to said X-direction planar drive coil and said Y-direction planar drive coil in accordance with said camera shake detected by said camera shake detection sensor to stabilize an object image which is formed on said imaging surface of said image pickup device through said photographing optical system.

31. The camera shake correction apparatus according to claim 30, wherein said controller applies said voltage to said X-direction planar drive coil and said Y-direction planar drive coil to reduce a difference between the amount of said camera shake detected by said camera shake detection sensor and the amount of movement of said connecting member which is detected by said position sensor.

32. A camera shake correction apparatus using said stage apparatus according to claim 29, said camera shake correction apparatus comprising:

a camera which incorporates said stage apparatus;

a correction lens located in front of an image plane of a photographing optical system of said camera, positioned so that an optical axis of said correction lens coincides with an optical axis of said photographing optical system, said correction lens being movable together with said connecting member of said X-direction deformable body;

a camera shake detection sensor which detects camera shake of said camera; and a controller which applies a voltage to said X-direction planar drive coil and said Y-direction planar drive coil in accordance with said camera shake detected by said camera shake detection sensor to stabilize an object image which is formed on said imaging surface of said image pickup device through said photographing optical system.

33. The camera shake correction apparatus according to claim 32, wherein said controller applies said voltage to said X-direction planar drive coil and said Y-direction planar drive coil to reduce a difference between the amount of said camera shake detected by said camera shake detection sensor and the amount of movement of said connecting member which is detected by said position sensor.

\* \* \* \* \*